US011425266B2

(12) United States Patent
Suzuki

(10) Patent No.: US 11,425,266 B2
(45) Date of Patent: Aug. 23, 2022

(54) ELECTRONIC APPARATUS, INFORMATION PROCESSING APPARATUS, AND COMMUNICATION SYSTEM

(71) Applicant: Katsunori Suzuki, Shanghai (CN)

(72) Inventor: Katsunori Suzuki, Shanghai (CN)

(73) Assignee: Ricoh Company, Ltd., Tokyo (JP)

( * ) Notice: Subject to any disclaimer, the term of this patent is extended or adjusted under 35 U.S.C. 154(b) by 86 days.

(21) Appl. No.: 16/851,737

(22) Filed: Apr. 17, 2020

(65) Prior Publication Data

US 2020/0244820 A1 Jul. 30, 2020

Related U.S. Application Data

(63) Continuation of application No. 15/923,177, filed on Mar. 16, 2018, now Pat. No. 10,652,405.

(30) Foreign Application Priority Data

Mar. 17, 2017 (JP) .............................. JP2017-052531

(51) Int. Cl.
*H04N 1/00* (2006.01)

(52) U.S. Cl.
CPC ......... *H04N 1/00103* (2013.01); *H04N 1/001* (2013.01); *H04N 1/00307* (2013.01); *H04N 2201/0094* (2013.01)

(58) Field of Classification Search
CPC ............... H04N 1/00103; H04N 1/001; H04N 1/00307; H04N 2201/0094
See application file for complete search history.

(56) References Cited

U.S. PATENT DOCUMENTS

| 6,396,518 B1 | 5/2002 | Dow et al. |
| 8,189,225 B1 | 5/2012 | Lo et al. |
| 9,158,770 B1 | 10/2015 | Beadles |
| 9,516,473 B1 | 12/2016 | Haapanen et al. |

(Continued)

FOREIGN PATENT DOCUMENTS

| JP | 2002-300297 A | 10/2002 |
| JP | 2009-253588 A | 10/2009 |

(Continued)

OTHER PUBLICATIONS

Japanese communication with the dispatch No. 768984 issued by the Japan Patent Office dated Nov. 2, 2021 for Japanese Patent Application No. 2020-204817.

(Continued)

*Primary Examiner* — Juan M Guillermety
(74) *Attorney, Agent, or Firm* — Harness, Dickey & Pierce, P.L.C.

(57) ABSTRACT

An electronic apparatus includes circuitry to receive a request for generating electronic data from an information processing apparatus via a first communication network, generate the electronic data, receive storage destination information designating a storage destination of the electronic data from the information processing apparatus via the first communication network, and transmit the generated electronic data to the storage destination via a second communication network, different from the first communication network, based on the storage destination information received from the information processing apparatus.

16 Claims, 16 Drawing Sheets

(56) References Cited

U.S. PATENT DOCUMENTS

| | | |
|---|---|---|
| 9,549,089 B1 | 1/2017 | Tredoux et al. |
| 9,894,471 B1 | 2/2018 | Zalewski et al. |
| 2006/0256372 A1 | 11/2006 | Suzuki |
| 2008/0019290 A1 | 1/2008 | Suzuki |
| 2008/0239373 A1 | 10/2008 | Suzuki |
| 2010/0309500 A1 | 12/2010 | Suzuki |
| 2010/0315672 A1 | 12/2010 | Suzuki |
| 2010/0328720 A1 | 12/2010 | Suzuki |
| 2011/0212717 A1 | 9/2011 | Rhoads et al. |
| 2011/0299110 A1 | 12/2011 | Jazayeri et al. |
| 2012/0012569 A1 | 1/2012 | Severino |
| 2012/0057189 A1 | 3/2012 | DeRoller |
| 2012/0147420 A1 | 6/2012 | Nishimi et al. |
| 2012/0284638 A1 | 11/2012 | Cutler et al. |
| 2012/0317621 A1 | 12/2012 | Mihara |
| 2013/0238372 A1 | 9/2013 | Jordan |
| 2013/0268999 A1 | 10/2013 | Kiang et al. |
| 2013/0278966 A1 | 10/2013 | Saito et al. |
| 2013/0314734 A1 | 11/2013 | Suzuki |
| 2013/0325595 A1 | 12/2013 | Ilicak |
| 2013/0342866 A1 | 12/2013 | Hansen et al. |
| 2014/0029047 A1 | 1/2014 | Giannetti et al. |
| 2014/0108606 A1 | 4/2014 | Beadles |
| 2015/0003595 A1 | 1/2015 | Yaghi et al. |
| 2015/0007109 A1 | 1/2015 | Yun |
| 2015/0092233 A1 | 4/2015 | Jeong |
| 2015/0212769 A1 | 7/2015 | Norota et al. |
| 2016/0050326 A1 | 2/2016 | Lee et al. |
| 2016/0065718 A1 | 3/2016 | Yamada |
| 2016/0182170 A1 | 6/2016 | Daoura et al. |
| 2016/0269989 A1 | 9/2016 | Komine et al. |
| 2017/0048416 A1 | 2/2017 | Cho et al. |
| 2017/0054859 A1 | 2/2017 | Zehler et al. |
| 2017/0054866 A1 | 2/2017 | Cho |
| 2017/0078501 A1 | 3/2017 | Chang et al. |
| 2017/0126671 A1 | 5/2017 | Haapanen et al. |
| 2017/0230536 A1 | 8/2017 | Haapanen et al. |
| 2017/0257516 A1 | 9/2017 | Panda |
| 2017/0264759 A1* | 9/2017 | Kawabata .......... H04N 1/00228 |
| 2017/0346692 A1 | 11/2017 | Haapanen et al. |
| 2018/0183948 A1* | 6/2018 | Taguchi ............. H04N 1/00225 |
| 2018/0213114 A1 | 7/2018 | Utsumi |
| 2018/0232185 A1 | 8/2018 | Anbalagan et al. |
| 2018/0335985 A1 | 11/2018 | Kimura |
| 2019/0129669 A1 | 5/2019 | Takahashi et al. |
| 2019/0187944 A1 | 6/2019 | Fukushima |
| 2019/0209022 A1 | 7/2019 | Sobol et al. |
| 2019/0271590 A1* | 9/2019 | Li ......................... G01J 3/0272 |

FOREIGN PATENT DOCUMENTS

| | | |
|---|---|---|
| JP | 2014-192824 A | 10/2014 |
| JP | 2015/159533 A | 9/2015 |
| JP | 2016-051431 A | 4/2016 |

OTHER PUBLICATIONS

Communication with the dispatch No. 213621 issued by the Japan Patent Office dated May 10, 2022 for Japanese patent application No. 2020-204817.

\* cited by examiner

PLEASE INPUT ACCESS INFORMATION OF CLOUD STORAGE:

REGISTRATION NAME: ▭ ~502

TYPE: ▭ ~503

URL: ▭ ~504

USER NAME: ▭ ~505

PASSWORD: ▭ ~506

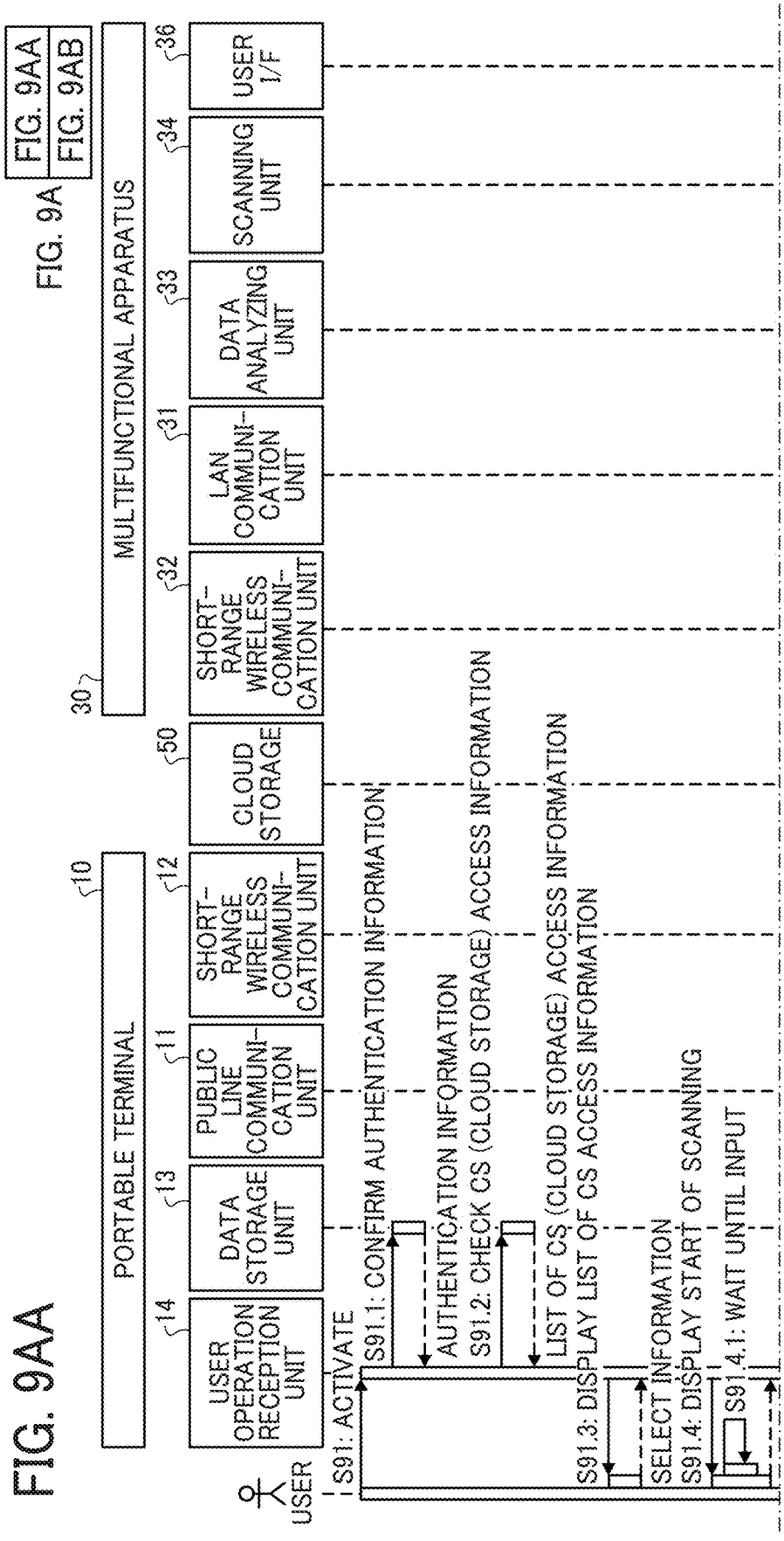

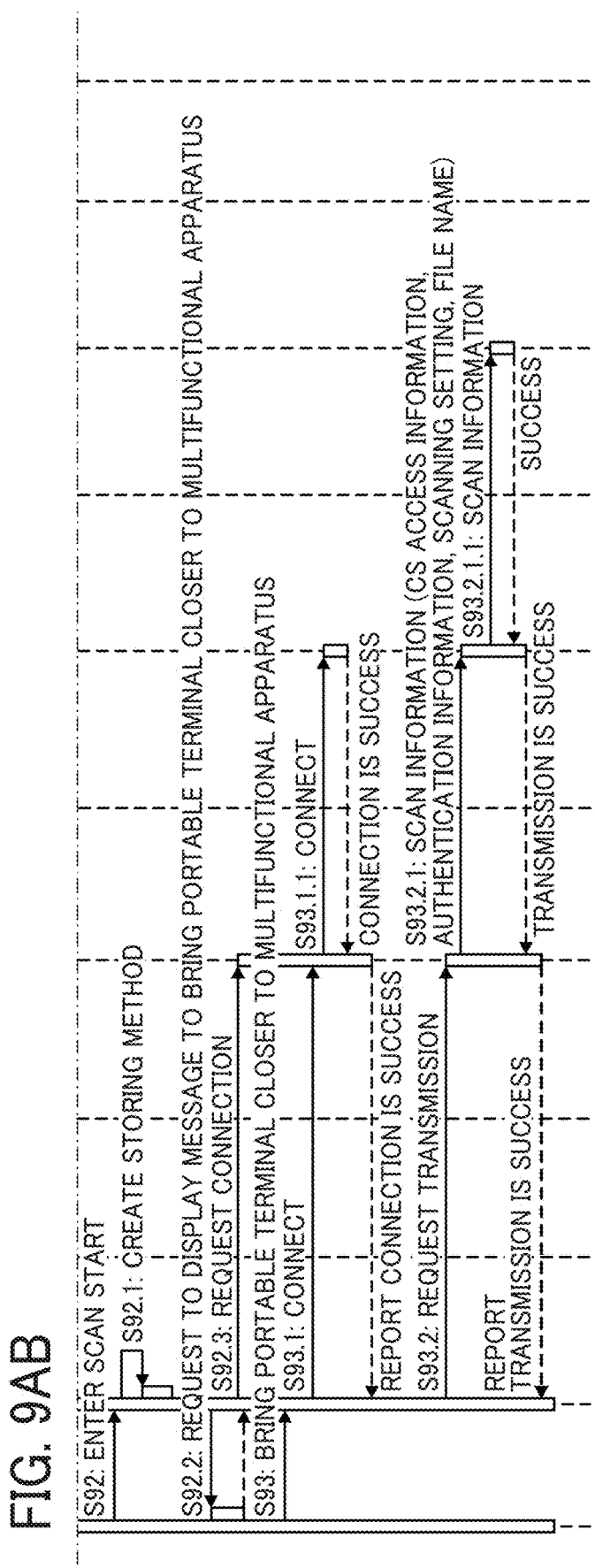

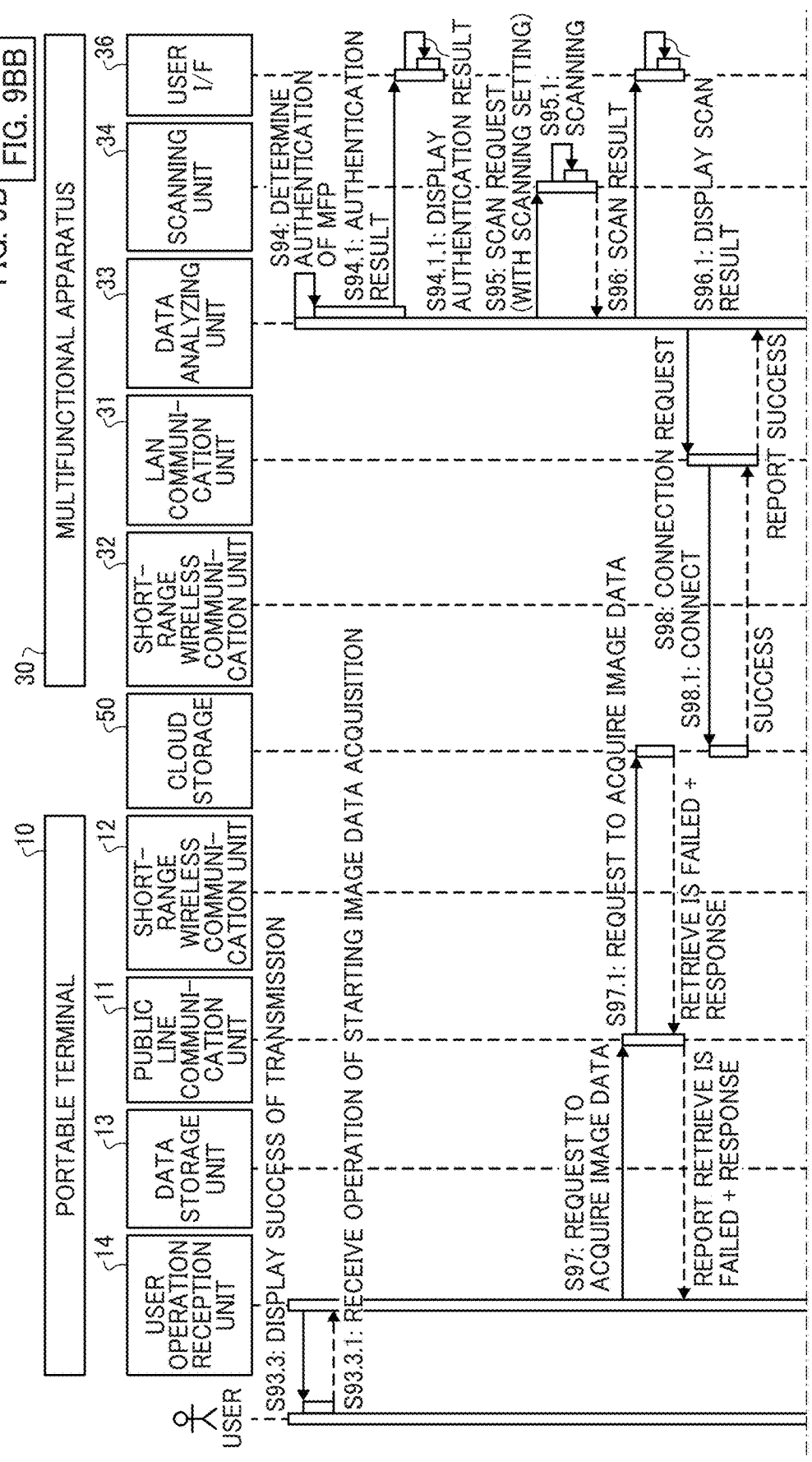

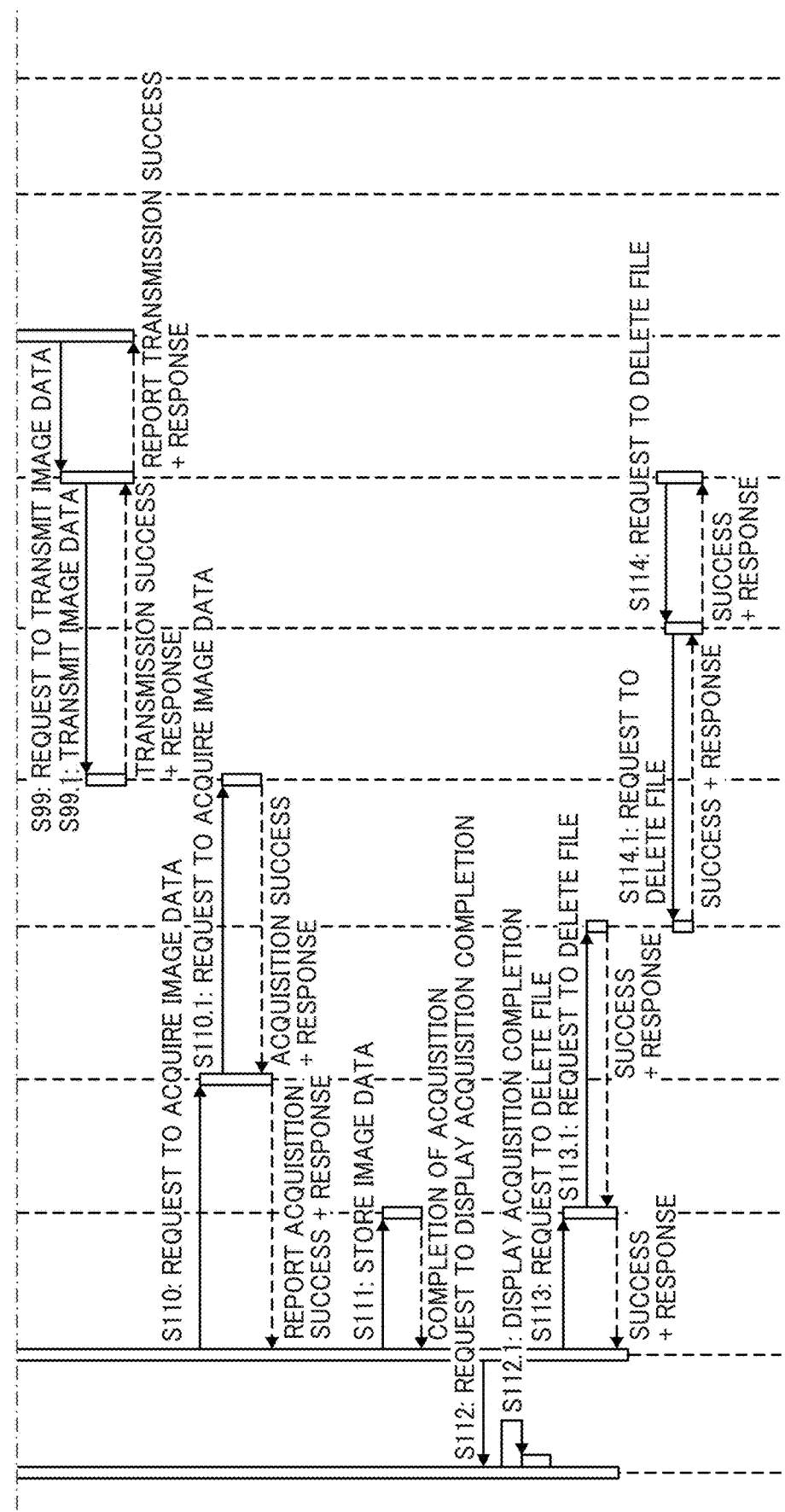

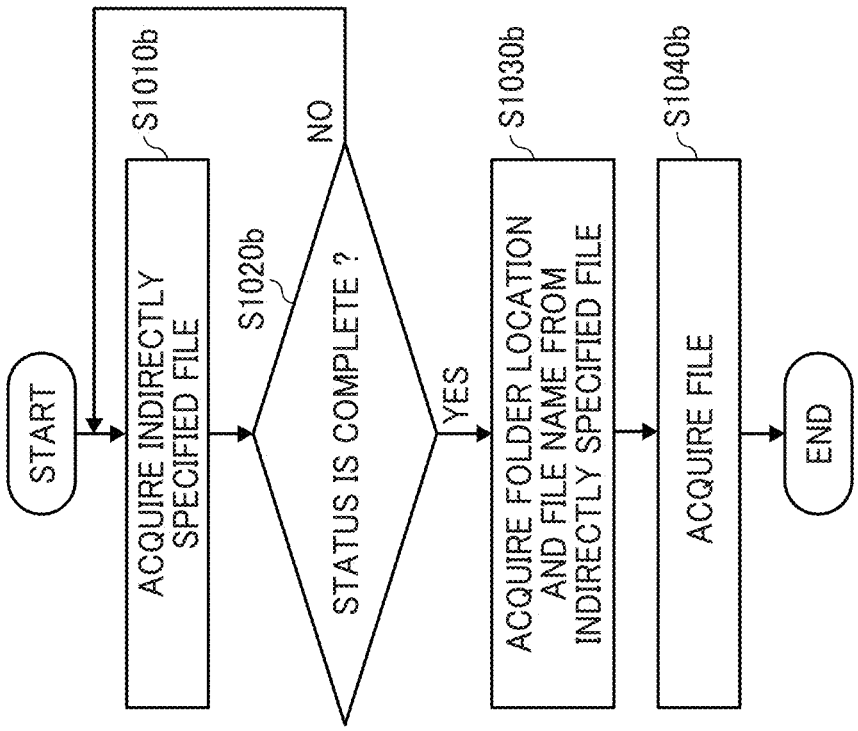
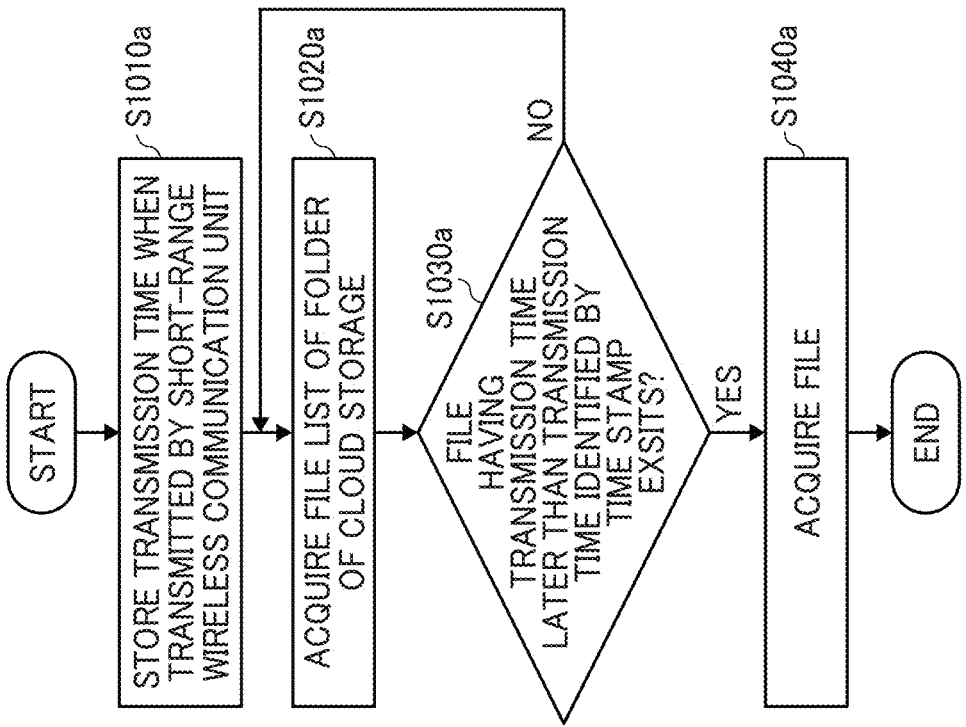

511

PLEASE INPUT ACCESS CONDITION OF CLOUD STORAGE:

512 — ⦿ a. USE FOLLOWING ADDRESS ONLY

513 — ○ b. NOT USE FOLLOWING ADDRESS

514 — [                    ]

SEPARATE ENTRY BY USING SEMICOLON(;)

ELECTRONIC APPARATUS, INFORMATION PROCESSING APPARATUS, AND COMMUNICATION SYSTEM

CROSS-REFERENCE TO RELATED APPLICATION

This application is a continuation of and claims priority under 35 U.S.C. § 120/121 to U.S. application Ser. No. 15/923,177, filed Mar. 16, 2018, which claims priority pursuant to 35 U.S.C. § 119(a) to Japanese Patent Application No. 2017-052531, filed on Mar. 17, 2017 in the Japan Patent Office, the disclosure of each of which are incorporated by reference herein in their entirety.

BACKGROUND

Technical Field

This disclosure relates to an electronic apparatus, an information processing apparatus, and a communication system.

Background Art

Pull print services employ portable terminals and a cloud server disposed on the Internet, in which the portable terminals transmit document data to the cloud server, the cloud server stores the document data, and then users use any multifunctional apparatus to print the document data. In this configuration, each user can print the document data using a multifunctional apparatus disposed at a site or location such as a travel destination of user.

If the above described operation can be performed by operating the multifunctional apparatus from the portable terminal, it is convenient for the users. However, the portable terminal may not be able to communicate with the multifunctional apparatuses in some cases. Technologies for acquiring communication information for communicating with the multifunctional apparatus by the portable terminal using a short-range wireless communication are known. For example, one technology discloses an image processing system including a portable terminal and a multifunctional apparatus, in which the portable terminal acquires communication information from the multifunctional apparatus using a short-range wireless device, and then requests the multifunctional apparatus to print document data via a network using the acquired communication information.

Further, in addition to printing the image data by the multifunctional apparatus, users may want to acquire image data scanned by a scanner of the multifunctional apparatus into portable terminals. In this case, a user uses the multifunctional apparatus to scan the document data, establishes communication between the portable terminal and the multifunctional apparatus, and then receives the image data from the multifunctional apparatus by using the portable terminal.

When the portable terminal is configured to use a circuit-switched communication method such as 3G and LTE and another communication method such as a wireless local area network (LAN) and Wi-Fi, the portable terminal is typically set to use the circuit-switched communication method. Typically, the portable terminal and the multifunctional apparatus communicate with each other using another communication method. Therefore, when the portable terminal is to receive image data from the multifunctional apparatus, the user needs to switch the communication method from the circuit-switched communication method to another communication method.

Further, from the viewpoint of security, it is not desirable to connect the user portable terminal with the multifunctional apparatus connected to a network, using another communication method.

SUMMARY

In one aspect of the present invention, an electronic apparatus is devised. The electronic apparatus includes circuitry to receive a request for generating electronic data from an information processing apparatus via a first communication network, generate the electronic data, receive storage destination information designating a storage destination of the electronic data from the information processing apparatus via the first communication network, and transmit the generated electronic data to the storage destination via a second communication network, different from the first communication network, based on the storage destination information received from the information processing apparatus.

In another aspect of the present invention, an information processing apparatus is devised. The information processing apparatus includes circuitry to request an electronic apparatus to generate electronic data via a first communication network, transmit storage destination information designating a storage destination of the electronic data on a network to the electronic apparatus via the first communication network, and acquire the electronic data, generated by the electronic apparatus and then transmitted from the electronic apparatus to the storage destination designated on the network based on the storage destination information and stored in the designated storage destination, from the designated storage destination via a second communication network different from the first communication network.

In still another aspect of the present invention, a communication system is devised. The communication system includes an information processing apparatus, an electronic apparatus configured to communicate with the information processing apparatus, and a storage device on a network configured to communicate with the information processing apparatus and the electronic apparatus. The information processing apparatus includes first circuitry to transmit a storage destination information of electronic data to the electronic apparatus via a first communication network, the storage destination information of the electronic data is used by the electronic apparatus to store the electronic data in the storage device on the network, and acquire the electronic data, stored in the storage device by the electronic apparatus, from the storage device using the storage destination information via a second communication network different from the first communication network. The electronic apparatus includes second circuitry to receive the storage destination information from the information processing apparatus via the first communication network, generate the electronic data, and store the electronic data in the storage device on the network via the second communication network based on the storage destination information received from the information processing apparatus.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 illustrates an example of an access information input screen displayed on a display of the portable terminal of FIG. 3;

FIGS. 9AA, 9AB, 9BA, and 9BB illustrate an example of a sequence diagram when the portable terminal transmits cloud storage access information to the multifunctional apparatus, the multifunctional apparatus transmits image data to the cloud storage, and then the portable terminal acquires the image data from the cloud storage;

FIG. 10A is a flowchart illustrating a sequence when a file name is not designated in cloud storage access information;

FIG. 10B is a flowchart illustrating a sequence when an indirectly specified file is used;

Figure 1:
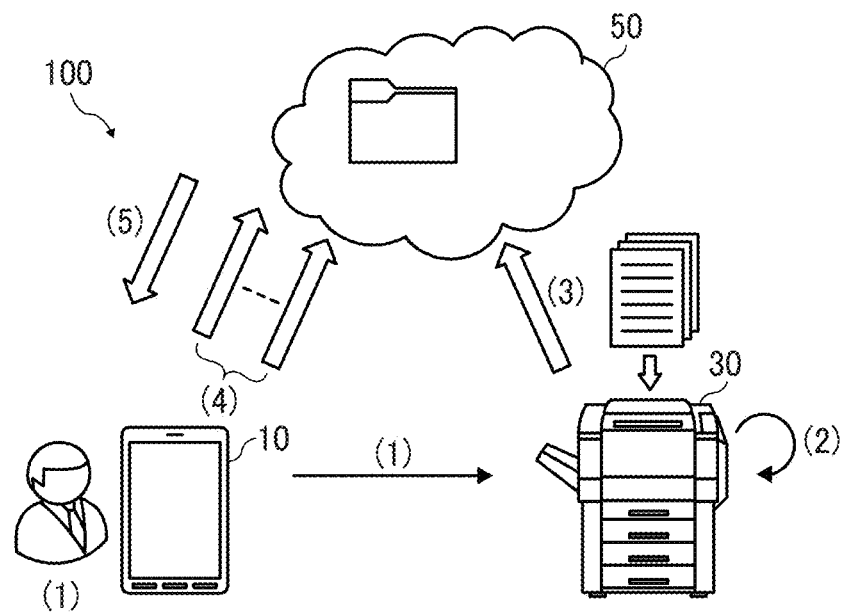
FIG. 1 schematically illustrates an operation in a communication system of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present invention with reference to the drawings.

Operation in Communication System:

FIG. 1 schematically illustrates an operation in a communication system 100 of an embodiment of the present invention. In the communication system 100, a user carries a portable terminal 10, and the portable terminal 10 has a subscriber identity module (SIM) card used for connecting the portable terminal 10 to a circuit-switched communication network such as a mobile telephone network. In the communication system 100, an operation is performed as follows.

(1) The portable terminal 10 communicates with a multifunctional apparatus 30 by short-range wireless communication such as Bluetooth (registered trademark) and near-field communication (NFC). The portable terminal 10 transmits storage destination information (storing method) of image data to the multifunctional apparatus 30 using the short-range wireless communication. For example, the portable terminal 10 transmits uniform resource locator (URL) and information used for authenticating the user at the cloud storage 50 as storage destination information (storing method)

(2) The user places a document sheet on a contact glass of the multifunctional apparatus 30 to scan the document sheet. The multifunctional apparatus 30 scans the document sheet to generate image data.

(3) The multifunctional apparatus 30 communicates with the cloud storage 50 using the storage destination information, and stores the generated image data in the cloud storage 50.

(4) While the multifunctional apparatus 30 is scanning the document sheet, the portable terminal 10 communicates with the cloud storage 50 using a connection method, and attempts to acquire the image data from the cloud storage 50.

(5) In case of the image data is registered in the cloud storage 50, the portable terminal 10 acquires the image data from the cloud storage 50.

Therefore, the user can receive the image data of the document sheet scanned by the multifunctional apparatus 30 by performing a simple operation such as an operation of starting the scanning. In the communication system 100, the user does not need to switch the portable terminal 10 from the circuit-switched communication to the wireless LAN. Further, the portable terminal 10 is not required to be connected to a network such as a wireless LAN connected to the multifunctional apparatus 30.

Terms:

The electronic data may be data transmitted or received through the network. In the embodiment, the electronic data is, for example, image data. In addition, the electronic data may be data processed by the multifunctional apparatus 30. For example, the electronic data may be text data generated from image data by performing the character recognition processing, or image data including a result of facial recognition processing. Further, the electronic data may be text data generated from audio data by performing the voice recognition processing, or translated document data. The original or initial data, to be processed, may be stored in the multifunctional apparatus 30 or transmitted from the portable terminal 10.

The storage destination information (storing method) indicates a location used for storing the electronic data. The storage destination information includes at least location information designating at least one resource disposed on the Internet. In addition, the multifunctional apparatus 30 may include one or more units used for storing image data in the cloud storage 50, and is configured to use a communication method such as a communication protocol and Web application interface (API).

Further, the storage location information indicates a storage location where the electronic data is stored, which may be also referred to as address information. In the embodiment, the term of "URL" is used as an example of the storage location information.

Figure 2:
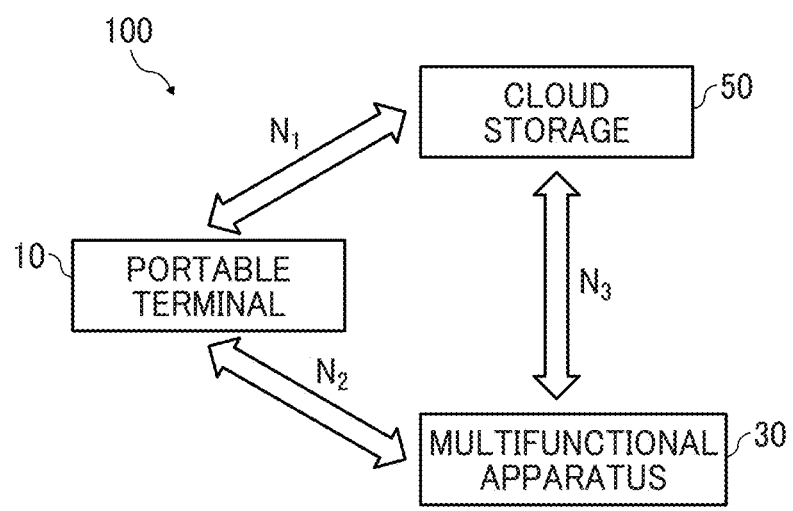
FIG. 2 is an example of a system configuration of the communication system of FIG. 1.

Configuration of Communication System:

FIG. 2 is an example of a system configuration of the communication system 100. The communication system 100 includes, for example, the portable terminal 10, the cloud storage 50, and the multifunctional apparatus 30.

The portable terminal 10 and the cloud storage 50 communicate via a network N1. The network N1 employs a network using a circuit-switched public line such as 3G, 4G, or long term evolution (LTE). The circuit-switched public line is a communication line connecting a plurality of sites, in which unspecified users physically share and use the same line. For example, the circuit-switched public line includes a mobile telephone network or a personal handy phone system (PHS) communication network. Further, the portable terminal 10 can be configured to connect the portable terminal 10 to an access point via a wireless local area network (LAN) such as Wi-Fi to communicate with the cloud storage 50 via the Internet.

Further, the portable terminal 10 and the multifunctional apparatus 30 communicate via a network N2. The network N2 uses, for example, short-range wireless communication such as near field communication (NFC), Bluetooth, and Bluetooth Low Energy. Further, the network N2 may use infrared communication and visible light communication, which can be used in parallel with the public line communication.

Further, the multifunctional apparatus 30 and the cloud storage 50 communicate via a network N3. The network N3 is configured by, for example, a LAN constructed where the multifunctional apparatus 30 is installed, a provider network to connect the LAN to a provider network, and a communicate line provided by a line operator. When the network N3 includes a plurality of LANs, the network N3 is referred to as wide area network (WAN) or the Internet. The network N3 may be wired network or wireless network, and a combination of the both. Further, when the multifunctional apparatus 30 is directly connected to the public line network, the multifunctional apparatus 30 can be connected to the provider network without using LAN.

The portable terminal 10, used as an information processing apparatus, runs one or more application software (hereinafter, simply referred to as application) to be described later. The application has a function of acquiring or downloading image data from the cloud storage 50. The portable terminal 10 is configured to perform a printing operation of document data stored in the cloud storage 50 by using the multifunctional apparatus 30. The portable terminal 10 is, for example, a smartphone, a cellular phone, a tablet device, a game machine, a personal digital assistant (PDA), a digital camera, a wearable personal computer (PC), a notebook PC, or the like, but not limited thereto.

The cloud storage 50 is a storage device or apparatus disposed on the Internet. Further, the cloud storage 50 can be referred to as a storage device or apparatus that provides a disk space on the Internet to users. The cloud storage 50 can be also referred to as an online storage. The cloud storage 50 is available to various users, such as general users and companies. When the cloud storage 50 is used, companies do not need to build a file server environment by themselves, and the companies can increase or decrease the capacity of the storage depending on the needs of companies. Further, the multifunctional apparatus 30 is configured to register image data on the cloud storage 50 via the Internet, and the portable terminal 10 is configured to retrieve the image data stored on the cloud storage 50 via the Internet.

Although the cloud storage 50 has a greater storage capacity, the cloud storage 50 can be also used as an information processing apparatus as well as the storage device or apparatus. The cloud means cloud computing, which means that resources on the network can be used without being aware of specific hardware resources. The cloud storage 50 is not required to be housed in one housing, or the cloud storage 50 is not required to be one single apparatus, but the cloud storage 50 can be configured by dynamically connecting and disconnecting hardware resources depending on processing loads. Further, the cloud storage 50 can be built in a virtual environment inside a single information processing apparatus or the cloud storage 50 can be built among a plurality of information processing apparatuses.

The multifunctional apparatus 30 is an electronic apparatus such as an image forming apparatus, an image processing apparatus, or a printer. The multifunctional apparatus 30 includes, for example, a scanning function in this disclosure. The multifunctional apparatus 30 generates electronic data to be transmitted to the cloud storage 50. However, the multifunctional apparatus 30 may have a facsimile function, a print function, or a copy function. Further, the multifunctional apparatus 30 may be referred to as a multifunctional peripherals (MFP), a copier, or an office apparatus. Further, the multifunctional apparatus 30 may have various image processing functions such as optical character recognition (OCR) function.

The multifunctional apparatus 30 may have a function of generating image data such as a scanner function. Further, devices having an imaging function such as digital camera can be also used as the electronic apparatus of the embodiment. The electronic apparatus having the imaging function transmits the generated image data to the cloud storage 50.

Figure 3:
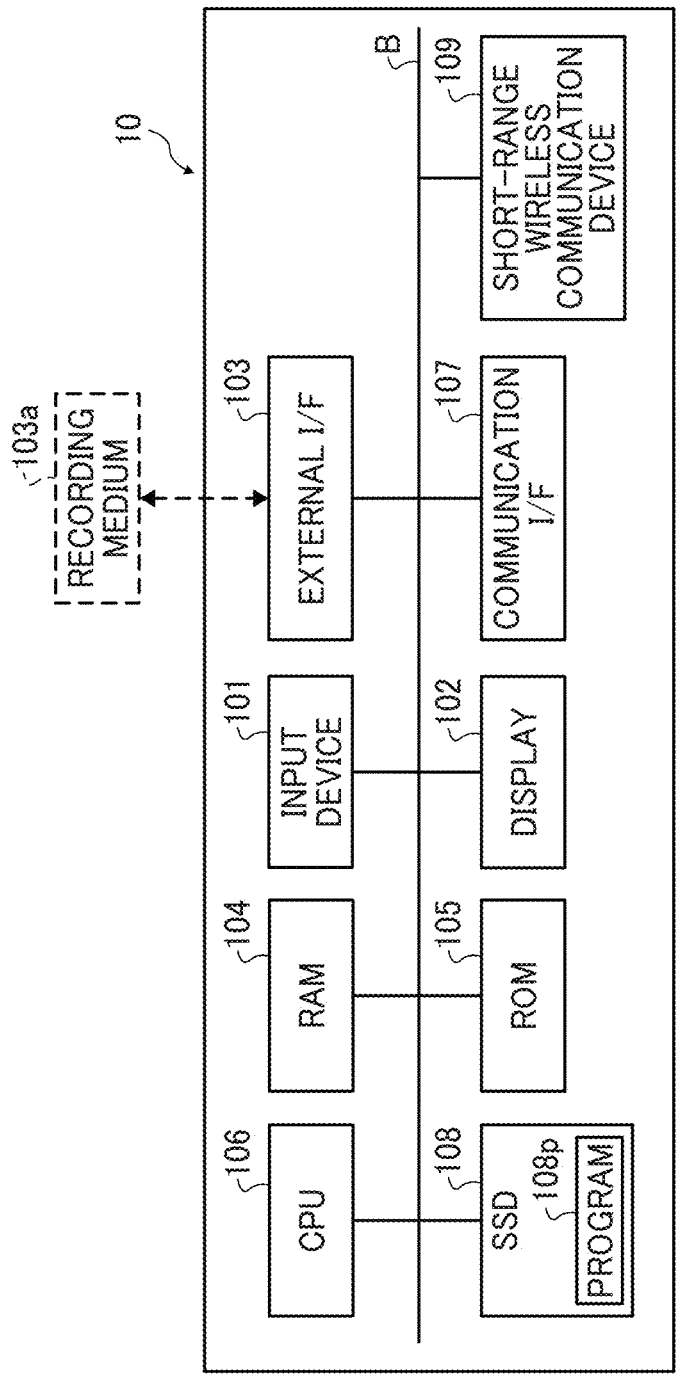
FIG. 3 is an example of a hardware block diagram of a portable terminal used in the communication system of FIG. 1.

Hardware Configuration of Portable Terminal:

The portable terminal 10 is implemented by using a hardware configuration illustrated in FIG. 3. FIG. 3 is an example of a hardware block diagram of the portable terminal 10. As illustrated in FIG. 3, the portable terminal 10 includes, for example, an input device 101, a display 102, an external interface (I/F) 103, a random access memory (RAM) 104, a read only memory (ROM) 105, a central processing unit (CPU) 106, a communication I/F 107, a solid state drive (SSD) 108, and a short-range wireless communication device 109, and these are connected each other by a bus B.

The input device 101 is, for example, a touch panel, and is used for inputting each operation signal to the portable terminal 10. Further, the input device 101 may be a keyboard, a mouse, or the like. The display 102 is, for example, a liquid crystal display (LCD), and displays results of processing by the portable terminal 10.

The external I/F 103 is an interface to connect with an external device. The external device includes, for example, a recording medium 103a. Further, the external I/F 103 is connected to a universal serial bus (USB) cable, the recording medium 103a, or the like. The recording medium 103a may store programs used for implementing a display method of the embodiment. The portable terminal 10 can read data from and write data to the recording medium 103a via the external I/F 103.

The recording medium 103a is, for example, a storage medium such as secure digital (SD) memory card. Further, the recording medium 103a may be a universal serial bus (USB) memory, a digital versatile disk (DVD), a compact disk (CD), or a flexible disk.

The RAM 104 is a volatile semiconductor memory or storage device used for temporarily storing programs and data. The ROM 105 is a nonvolatile semiconductor memory or storage device that can retain programs or data even when the power is turned off. The ROM 105 stores programs and data such as basic input/output system (BIOS), operating system (OS) settings, and network settings, which are executed when activating the portable terminal 10.

The CPU 106 is a processing device that controls the portable terminal 10 and functions of the portable terminal 10 by reading programs and data from a storage device such as the ROM 105 and/or the SSD 108 and executing the programs and data on the RAM 104. The CPU 106 may be one or more processing circuits or circuitry The communication I/F 107 is an interface for communication through the network N. For example, the communication I/F 107 is an interface used for connecting the portable terminal 10 to the cloud storage 50 via the network N1. That is, the communication I/F 107 is an interface used for connecting the portable terminal 10 to the Internet via the public line network. Further, the communication I/F 107 also has a function of connecting the portable terminal 10 to a wireless LAN or Wi-Fi.

The SSD 108 is a nonvolatile storage device that stores program 108p and data. The stored program 108p and data include, for example, an operating system (OS), which is a basic software for controlling the portable terminal 10, and applications for providing various functions on the OS. The SSD 108 manages the stored program 108p and data by using a given file system and/or database (DB). The portable terminal 10 may include a hard disk drive (HDD) instead of the SSD 108, or both of the SSD 108 and the HDD.

The short-range wireless communication device 109 is a communication device complied with communication standards such as NFC and Bluetooth communication standards. For example, in the case of NFC, the short-range wireless communication device 109 may be referred to as a reader and writer. With this configuration, the portable terminal 10 can perform data communication with the multifunctional apparatus 30 via the short-range wireless communication device 109.

The portable terminal 10 can implement various kinds of processing to be described later by using the above described hardware configuration.

Figure 4:
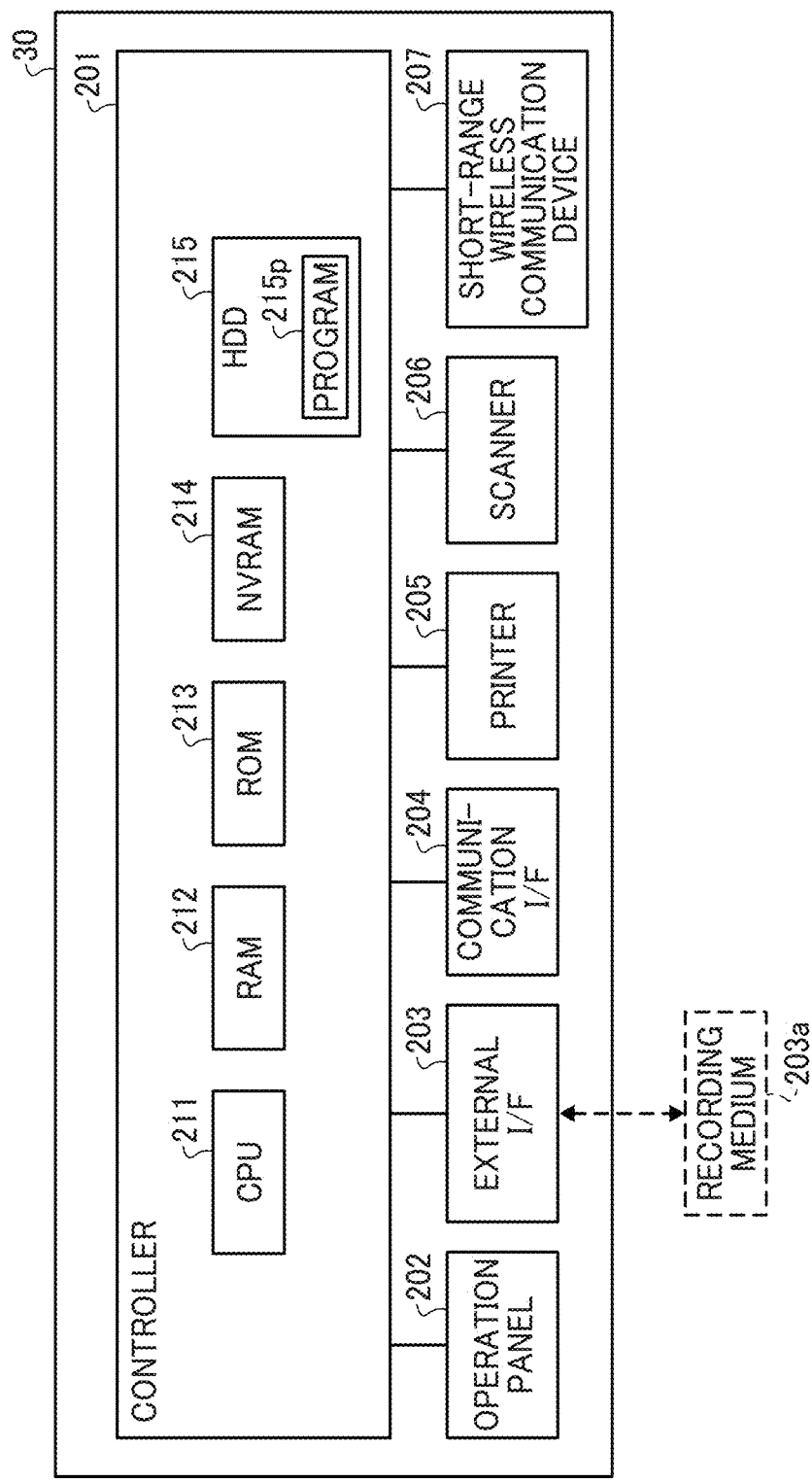
FIG. 4 is a an example of a hardware block diagram of a multifunctional apparatus used in the communication system of FIG. 1.

Hardware Configuration of Multifunctional Apparatus:

The multifunctional apparatus 30 can be implemented by using a hardware illustrated in FIG. 4. FIG. 4 is an example of a hardware block diagram of the multifunctional apparatus 30. As illustrated in FIG. 4, the multifunctional apparatus 30 includes, for example, a controller 201, an operation panel 202, an external I/F 203, a communication I/F 204, a printer 205, a scanner 206, and a short-range wireless communication device 207.

As illustrated in FIG. 4, the controller 201 includes, for example, a CPU 211, a RAM 212, a ROM 213, a nonvolatile random access memory (NVRAM) 214, and a HDD 215. The ROM 213 stores various programs and data. The RAM 212 temporarily stores programs and data. The NVRAM 214 stores, for example, setting information. Further, the HDD 215 stores various programs 215p and data.

The CPU 211 reads the program 215p, data, setting information from the ROM 213, the NVRAM 214, and/or the HDD 215, loads the program 215p, data, setting information on the RAM 212, and executes various processing to control and implement functions of the multifunctional apparatus 30.

The operation panel 202 includes, for example, an input unit for receiving an input from a user, and a display unit (including a touch panel) used for displaying information. The external I/F 203 is used as an interface to connect with an external device. The external device includes, for example, a recording medium 203a. The recording medium 203a includes, for example, a flexible disk, CD, DVD, SD memory card, and USB memory.

The communication I/F 204 is an interface for communication through the network N. In the embodiment, the multifunctional apparatus 30 is connected to the cloud storage 50 via the network N3 (FIG. 2).

The printer 205 is a printing device used for printing and outputting print target data. The scanner 206 is a scanning device used for optically scanning document, and converting the scanned data into electronic data.

The short-range wireless communication device 207 is a communication device complied with communication standards such as NFC and Bluetooth communication standards. For example, in the case of NFC, the short-range wireless communication device 207 may be referred to as a reader and writer. With this configuration, the multifunctional apparatus 30 can perform data communication with the portable terminal 10 via the short-range wireless communication device 207.

The multifunctional apparatus 30 can implement various processes to be described later by using the above described hardware configuration.

Figure 5:
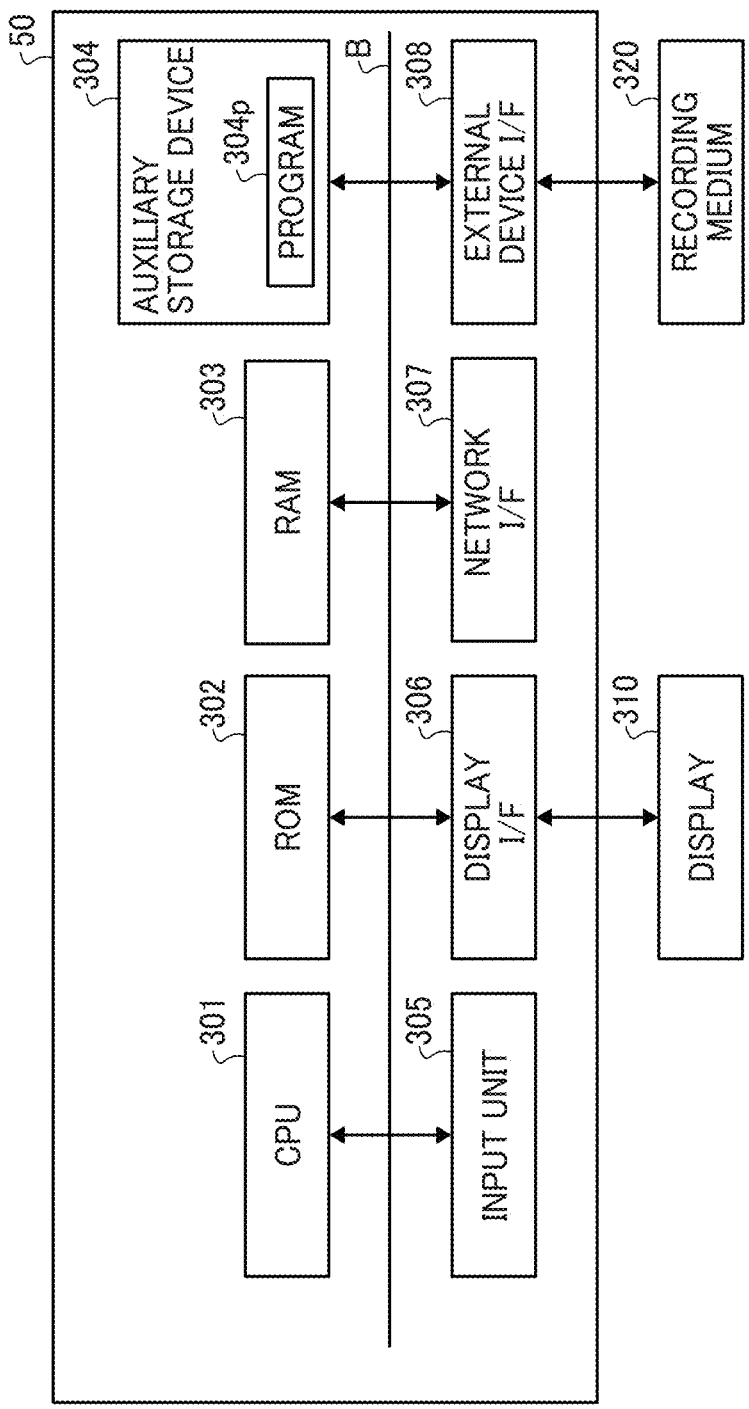
FIG. 5 is an example of a hardware block diagram of a cloud storage used in the communication system of FIG. 1.

Hardware Configuration of Cloud Storage:

FIG. 5 is an example of a hardware block diagram of the cloud storage 50. The cloud storage 50 includes, for example, a CPU 301, a ROM 302, a RAM 303, and an auxiliary storage device 304. The cloud storage 50 further includes, for example, an input unit 305, a display I/F 306, a network I/F 307, and an external device I/F 308. These units of the cloud storage 50 are connected to each other via a bus B. The cloud storage 50 can be used as an information processing apparatus.

The CPU 301 executes various programs 304p and operating system (OS) stored in the auxiliary storage device 304. The ROM 302 is a nonvolatile memory. The ROM 302 stores a system loader, data, or the like.

The RAM 303 is a main memory such as dynamic random access memory (DRAM), and static random access memory (SRAM). The program 304p stored in the auxiliary storage device 304 is loaded on the RAM 303 when executed by the CPU 301, and the RAM 303 is used as a working area of the CPU 301.

The auxiliary storage device 304 stores the program 304p to be executed by the CPU 301 and various databases to be used when the program 304p is executed by the CPU 301. The auxiliary storage device 304 is, for example, a nonvolatile memory such as a hard disk drive (HDD), and a solid state drive (SSD).

The input unit 305 is an interface used for inputting various instructions to the cloud storage 50. For example, the input unit 305 includes a keyboard, a mouse, a touch panel, a voice input device, or the like. The input unit 305 may be included in the cloud storage 50 as necessary.

The display I/F 306 is used to display various information of the cloud storage 50 on the display 310 in the form of a cursor, a menu, a window, a character, or an image in accordance with a request from the CPU 301. The display I/F 306 is, for example, a graphic chip and a display I/F. The display I/F 306 may be included in the cloud storage 50 as necessary.

The network I/F 307 is a communication device that is used to communicate with the portable terminal 10 and the multifunctional apparatus 30 through the network. The network I/F 307 is, for example, an Ethernet (registered trademark) card, but not limited thereto. The network I/F 307 is connected to, for example, the network N1 and the network N3.

The external device I/F 308 is an interface used for connecting a USB cable or a recording medium 320 such as a USB memory.

Figure 6:
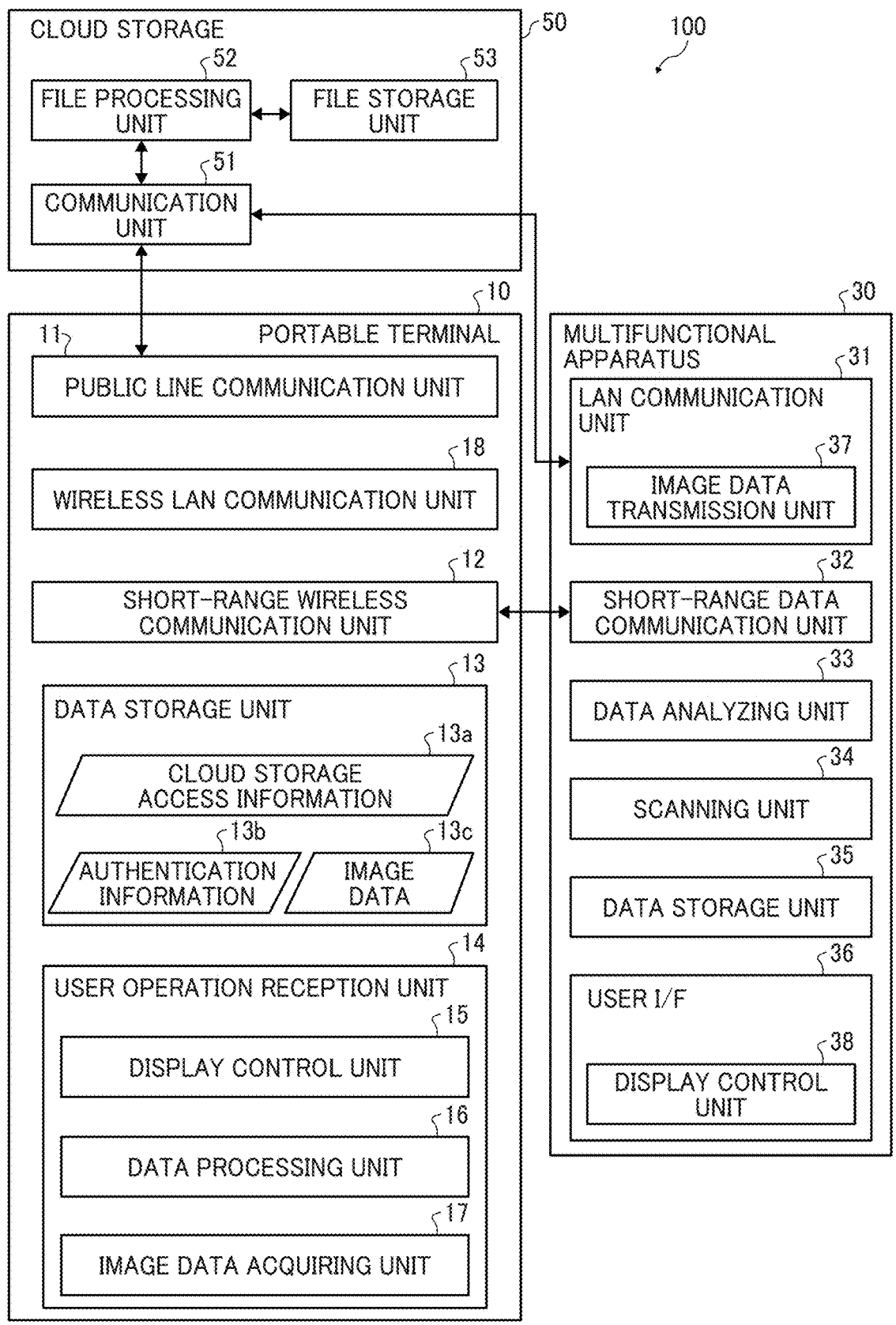
FIG. 6 is an example of a functional block diagram of the portable terminal, the multifunctional apparatus, and the cloud storage used in the communication system of FIG. 1.

Functional Configuration of Communication System:

FIG. 6 is an example of a functional block diagram of the portable terminal 10, the multifunctional apparatus 30, and the cloud storage 50 used in the communication system 100.

Functional Configuration of Portable Terminal:

As illustrated in FIG. 6, the portable terminal 10 includes, for example, a public line communication unit 11, a short-range wireless communication unit 12, a data storage unit 13, a user operation reception unit 14, and a wireless LAN communication unit 18. Each of the functional units of the portable terminal 10 is a function or means that is implemented when the CPU 106 loads the program 108p from the SSD 108 to the RAM 104, and executes the program 108p by using any one of the resources illustrated in FIG. 3. The program 108p includes, for example, one or more applications applicable to the communication system 100.

The public line communication unit 11 is implemented by executing the program 108p and controlling the communication I/F 107 by the CPU 106 illustrated in FIG. 3, and the public line communication unit 11 is connected to a public line of the circuit-switched communication such as 3G/4G/LTE to communicate with the cloud storage 50. The public line communication unit 11 and the short-range wireless communication unit 12 can be used for communication simultaneously or in parallel in the embodiment.

The wireless LAN communication unit 18 is implemented by executing the program 108p and controlling the communication I/F 107 by the CPU 106 illustrated in FIG. 3, and the wireless LAN communication unit 18 is connected to the wireless LAN to communicate with the multifunctional apparatus 30. The public line communication unit 11 and the wireless LAN communication unit 18 cannot be used for communication simultaneously or in parallel.

The short-range wireless communication unit 12 is implemented by executing the program 108p and controlling the short-range wireless communication device 109 by the CPU 106 illustrated in FIG. 3, and the short-range wireless communication unit 12 communicates with the multifunctional apparatus 30 by using short-range wireless communication (e.g., NFC/Bluetooth/Bluetooth LE).

The user operation reception unit 14 is implemented by executing the program 108p and controlling the input device 101 by the CPU 106 illustrated in FIG. 3, and the user operation reception unit 14 receives instructions such as inputting of cloud storage access information, to be described later, a selection of the cloud storage 50, and a start of scanning from a user.

Further, the user operation reception unit 14 includes, for example, a display control unit 15, a data processing unit 16, and an image data acquiring unit 17. The display control unit 15 is implemented by executing the program 108p and controlling the display 102 by the CPU 106 illustrated in FIG. 3, and the display control unit 15 generates and displays a screen used as a user interface (UI).

The data processing unit 16 is implemented by executing the program 108p by the CPU 106 illustrated in FIG. 3. The data processing unit 16 analyzes the cloud storage access information based on a user instruction received by the user operation reception unit 14, or based on an operation received by the user operation reception unit 14, and generates information used for accessing the cloud storage 50. Further, the data processing unit 16 stores cloud storage access information 13a and authentication information 13b in the data storage unit 13.

The image data acquiring unit 17 inquires image data, such as the latest image data file, to the cloud storage 50 by using the cloud storage access information 13a, and acquires the file storing the image data.

The data storage unit 13 is implemented by executing the program 108p by the CPU 106, and the RAM 104 or the SSD 108 illustrated in FIG. 3. The data storage unit 13 stores, for example, the cloud storage access information 13a, the authentication information 13b, and image data 13c. The image data 13c can be downloaded from the cloud storage 50 by the portable terminal 10. Further, the authentication information 13b is used for logging in to the multifunctional apparatus 30. The authentication information 13b includes, for example, a user name or user identification (ID), and a password to be described later. If the multifunctional apparatus 30 is configured not to request the login, the authentication information 13b may be omitted. An example of the cloud storage access information 13a is illustrated in Table 1.

TABLE 1

| Cloud storage ID | 12345 |
|---|---|
| URL | http://. . . |
| User name | ichiro |
| Password | xxxxx |

Table 1 is an example of the cloud storage access information 13a using a table format. The cloud storage access information 13a is used for accessing the cloud storage 50 by the portable terminal 10 or the multifunctional apparatus 30. As one example, the cloud storage access information 13a includes, for example, a cloud storage ID, a URL, a user name, and a password (see Table 1). The cloud storage ID is used for identifying each of the cloud storage 50. The ID stands for identification, and means an identifier or identification information. The ID includes, for example, name, sign, a string of characters, numerical value, or a combination of one or more of these for uniquely distinguishing a particular target from a plurality of targets.

The URL indicates a location and a communication method of resources such as files and services accessible on the network. In the embodiment, the URL may include a file name or may not include a file name. The URL is location information or address information indicating a location of a resource such as a location where image data is stored. The user name and the password are used to receive the authentication of a user from the cloud storage 50. Further, the cloud storage access information 13a may include a plurality of cloud storage access information.

Functional Configuration of Multifunctional Apparatus:

As illustrated in FIG. 6, the multifunctional apparatus 30 includes, for example, a LAN communication unit 31, a short-range data communication unit 32, a data analyzing unit 33, a scanning unit 34, a data storage unit 35, and a user I/F 36. Each of these functions of the multifunctional apparatus 30 is a function that is implemented when the CPU 211 loads the program from the HDD 215 to the RAM 212, and executes the program by using any one of the resources illustrated in FIG. 4.

The LAN communication unit 31 is implemented by executing the program 215p and controlling the communication I/F 204 by the CPU 211 illustrated in FIG. 4, and the LAN communication unit 31 is connected to LAN, either wired or wireless, to communicate with the cloud storage 50. That is, the LAN communication unit 31 is connected to the Internet. The LAN communication unit 31 includes, for example, an image data transmission unit 37. After image data is generated by scanning document by using the scanning unit 34, and then analyzed by the data analyzing unit 33, the image data transmission unit 37 transmits the image data to the cloud storage 50 by using the acquired URL.

The short-range data communication unit 32 is implemented by executing the program 215p and controlling the short-range wireless communication device 207 by the CPU 211 illustrated in FIG. 4, and the short-range wireless communication unit 32 communicates with other apparatuses by using short-range wireless communication (e.g., NFC/Bluetooth/Bluetooth LE). That is, the short-range wireless communication unit 32 communicates with the portable terminal 10 to acquire the cloud storage access information 13a, the authentication information 13b, the scanning setting, and the file name (when the file name is already determined).

The data analyzing unit 33 is implemented by executing the program by the CPU 211 illustrated in FIG. 4, and the data analyzing unit 33 extracts the cloud storage access information 13a, the authentication information 13b, the scanning setting, and the file name (when the file name is determined) received via the short-range data communication unit 32. Then, processing using each piece of information is performed.

The scanning unit 34 is implemented by executing the program 215p and controlling the scanner 206 by the CPU 211 illustrated in FIG. 4, and the scanning unit 34 scans document placed on a contact plate of the scanner 206 by a user to generate image data.

The user I/F 36 is implemented by executing the program 215p and controlling the operation panel 202 by the CPU 211 illustrated in FIG. 4. The user I/F 36 is used as an interface with a user, and is used to receive operations or instructions from the user. The user I/F 36 includes a display control unit 38. The display control unit 38 is used to display messages, such as a message that the image data cannot be transmitted to the cloud storage 50.

The data storage unit 35 is implemented by executing the program 215p by the CPU 211, and the RAM 212, the ROM 213, and the HDD 215 illustrated in FIG. 4. The data storage unit 35 stores the cloud storage access information 13a, the authentication information 13b, the scanning setting, the file name (when the file name is determined), and the image data.

Functional Configuration of Cloud Storage:

As illustrated in FIG. 6, the cloud storage 50 includes, for example, a communication unit 51, a file processing unit 52, and a file storage unit 53. Each of these functional units of the cloud storage 50 is a function or means that is implemented when the CPU 301 loads the program from the auxiliary storage device 304 to the RAM 303 and executes the program by using any one of the resources illustrated in FIG. 5.

The communication unit 51 is implemented by executing the program and controlling the network I/F 307 by the CPU 301 illustrated in FIG. 5, and the communication unit 51 communicates with the portable terminal 10 and the multifunctional apparatus 30 to transmit and receive various data. Since the communication unit 51 is connected to LAN or the like, it is not necessary to connect the communication unit 51 to the public line when the communication unit 51 communicates with the portable terminal 10.

The file processing unit 52 is implemented by executing the program by the CPU 301 illustrated in FIG. 5, and the file processing unit 52 stores image data received from the multifunctional apparatus 30 in the file storage unit 53, and reads out a file stored in the file storage unit 53 when the file is requested from the portable terminal 10.

The file storage unit 53 is implemented by the RAM 303 and the auxiliary storage device 304 illustrated in FIG. 5, and stores various files including image data.

Figure 7:
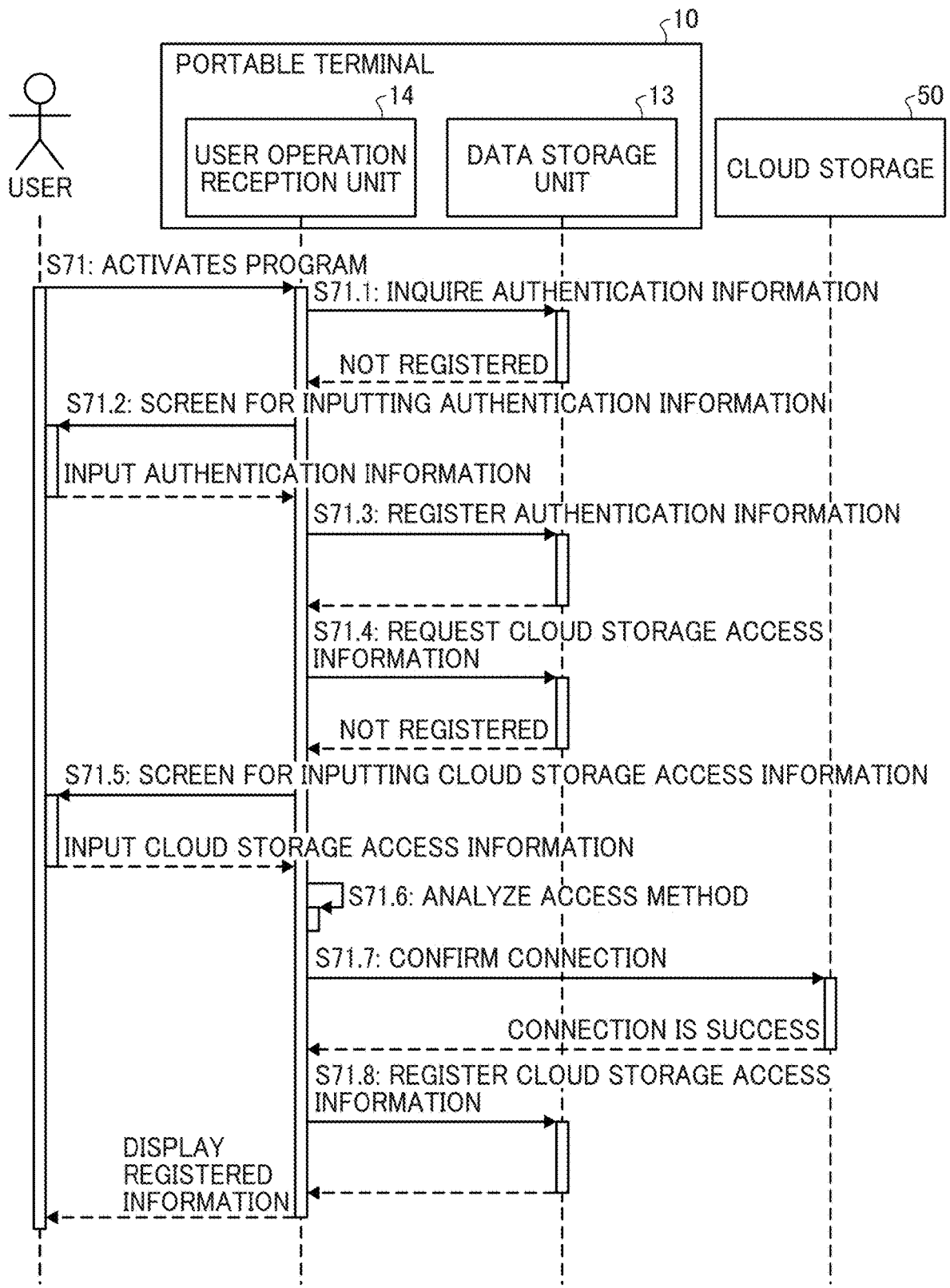
FIG. 7 is an example of a sequence diagram when the portable terminal receives cloud storage access information.

Registration of Cloud Storage Access Information:

Hereinafter, a description is given of a method of receiving the cloud storage access information 13a by using the portable terminal 10 with reference to FIGS. 7 and 8. FIG. 7 is an example of a sequence diagram when the portable terminal 10 receives the cloud storage access information 13a. FIG. 8 illustrates an example of an access information input screen displayed on the display 102 of the portable terminal 10.

S71: A user operates the portable terminal 10 to activate the program 108p such as an application on the portable terminal 10.

S71.1: When the application is activated, the user operation reception unit 14 inquires the data storage unit 13 whether the authentication information 13b is registered in the data storage unit 13. The authentication information 13b is to be used by the multifunctional apparatus 30 for authenticating the user. Since the authentication information 13b is not yet registered in the portable terminal 10 at the time of the initial activation, the user operation reception unit 14 determines that the authentication information 13b is not registered in the data storage unit 13.

S71.2: Since the authentication information 13b is not yet registered in the data storage unit 13, the display control unit 15 of the user operation reception unit 14 displays a screen used for inputting the authentication information 13b on the display 102. The user can enter a user name and a password by following the instructions on the screen.

S71.3: When the user completes the inputting of authentication information, the user operation reception unit 14 registers the input authentication information in the data storage unit 13. With this configuration, the authentication information 13b is stored in the data storage unit 13.

S71.4: Then, the user operation reception unit 14 requests the data storage unit 13 to acquire the registered cloud storage access information 13a from the data storage unit 13. Since the cloud storage access information 13a is not yet registered at the time of the initial activation, the user operation reception unit 14 determines that the cloud storage access information is not yet registered in the data storage unit 13.

S71.5: Since the cloud storage access information 13a is not yet registered in the data storage unit 13, the display control unit 15 of the user operation reception unit 14 displays an access information input screen 501 (FIG. 8) used for inputting the cloud storage access information 13a on the display 102. Then, the user inputs the cloud storage ID, URL, the user name, and the password by following the instructions displayed on the access information input screen 501.

S71.6: After the user operation reception unit 14 receives the inputting of the cloud storage access information 13a, the data processing unit 16 analyzes an access method to the cloud storage 50. For example, the data processing unit 16 acquires a communication method (e.g., communication protocol) from the "type," acquires the "URL," and checks whether a file name is included in the URL. If the file name is included in the URL, the data processing unit 16 acquires the file name.

S71.7: Then, the user operation reception unit 14 checks whether the portable terminal 10 can be actually connected to the cloud storage 50 by using the cloud storage access information 13a input by the user. That is, the user operation reception unit 14 checks whether the public line communication unit 11 communicates with the cloud storage 50 using the acquired communication method and the "URL." In this example case, it is assumed that the connection is successful.

S71.8: When the connection of the portable terminal 10 with the cloud storage 50 is successful, the data processing unit 16 of the user operation reception unit 14 registers the cloud storage access information 13a in the data storage unit 13. In this way, the cloud storage access information 13a can be registered after confirming whether the portable terminal 10 can be actually connected to the cloud storage 50.

If the connection of the portable terminal 10 with the cloud storage 50 is not successful in step S71.7, the user operation reception unit 14 requests the user to input the cloud storage access information 13a again.

Access Information Input Screen:

As illustrated in FIG. 8, the access information input screen 501 displays, for example, a plurality of input fields such as a registration name 502 (i.e., name that can identify the cloud storage 50), a type 503 of the cloud storage 50, a URL 504 indicating a storage location, a user name 505, and a password 506 necessary for accessing the cloud storage 50. The setting contents are to be described for each type of the cloud storage 50 as follows.

File Transfer Protocol (FTP) server:

The cloud storage 50 is, for example, a file transfer protocol (FTP) server. The FTP server communicates with a client by using a communication protocol known as FTP. The setting contents in this case are as follows.

Registration name: ABC
    FTP site (file) type: FTP
    URL: ftp://ftp.ABC.co.jp/public/printdata/mydata.dat
    User name: user01
    Password: password01

In this case, the data processing unit 16 analyzes that the data can be transmitted by FTP based on the "type," and since a resource designated by the URL is a file of "mydata. dat," the data processing unit 16 determines that image data is to be stored in this file. In this case, the file name to be transmitted to the cloud storage 50 by the multifunctional apparatus 30 becomes the file name designated by "mydata. dat." In a case that the URL includes the file name, the multifunctional apparatus 30 does not need to create a file name.

On the other hand, when the URL is registered as follows, a folder becomes the registration destination of the image data.

URL: ftp://ftp.ricoh.co.jp/public/printdata/

In this case, since the resource designated by the URL is the folder, the portable terminal 10 or the multifunctional apparatus 30 assigns a unique file name to each image data. The file name may be assigned by either the portable terminal 10 or the multifunctional apparatus 30. This is because the portable terminal 10 can acquire the file from the cloud storage 50 without knowing the file name. Further, the multifunctional apparatus 30 uses the designated folder as the cloud storage 50, and stores the image data with the assigned file name. Since the file name is the unique file name, the multifunctional apparatus 30 can handle multiple files simultaneously. The processing of handling a plurality of files (i.e., transmitting a plurality of files such as one or more image data at the same time by the multifunctional apparatus 30) may be performed when storing document in files page-by-page basis and transmitting the files to the cloud storage 50.

WebDAV server:

The cloud storage 50 is, for example, a Web-based distributed authoring and versioning (WebDAV) server. The WebDAV server communicates with a client using a communication protocol called WebDAV. The setting contents in this case are as follows.

Registration name: ABC WebDAV
    Site type: WebDAV
    URL: http://webDAV.ABC.co.jp/public/printdata/mydata.dat
    User name: user01
    Password: password01

In this case, since the data processing unit 16 and the data analyzing unit 33 can recognize that the WebDAV server is used based on the "type," the portable terminal 10 and the multifunctional apparatus 30 can access the cloud storage 50 using the WebDAV protocol. Further, since a location of a file to be used as the storage is known from the URL, the portable terminal 10 and the multifunctional apparatus 30 use the WebDAV server as the cloud storage 50. In this case too, "mydata.dat" becomes the file name.

Storage Service of Google®:

The cloud storage 50 is, for example, a storage service provided from Google. This storage service is known as a service, in which a general user can save his or her files, or files of a group.

Registration name: Google Drive user 01
Type: Google Drive
URL: https://drive.google.com/drive/folders/01234abcde
User name: user01
Password: password01

In this case, the data processing unit 16 and the data analyzing unit 33 can recognize that the server is Google Drive based on the "type." Further, the data processing unit 16 determines that a specific folder of Google Drive is used based on the contents of URL. Since "01234abcde" is a folder name, a file name is required, in which the file name of the Google Drive is determined when the file is registered. The details are to be described with reference to FIG. 9.

Further, the data processing unit 16 and the data analyzing unit 33 determines that the portable terminal 10 and the multifunctional apparatus 30 can access the cloud storage 50 using a Web application programming interface (API) such as representational state transfer (REST) I/F because the "type" is Google Drive. That is, the data processing unit 16 stores a relationship of the service of the cloud storage 50 such as Google Drive and the corresponding Web API using a table. The Web API is a sequential procedure or rule for calling a program over the Internet. The Representational State Transfer (REST) is a calling interface for requesting data to a server or the like. In general, when the HTTP method (e.g., POST/GET) is used for accessing, a message written in XML is transmitted. The REST is recommended by Google Drive, and thereby the REST may not be required for the cloud storage 50 in some cases.

Indirectly Specified Storage Destination:

The portable terminal 10 can indirectly designate a file name in the cloud storage access information 13*a*. When the portable terminal 10 indirectly specifies or designates the storage destination information (storing method), a file including the storage destination information (storing method) is referred to as an indirectly specified file. The indirectly specified file designates a location where image data is stored on the network.

The portable terminal 10 designates a file name as the unique file name. Since a file name designated by one user may be also designated by another user (i.e., the same file name is designated by different users), the designation of the file name by the user may not be preferable. The unique file name may be preferably generated by using uniquely identifiable information such as a model, a manufacturing number, and a telephone number of the portable terminal 10. The following is an example of cloud storage access information 13*a* when the indirectly specified file is used.

Registration name: FTP (when indirectly specified file is used)
Type: FTP.indirect
URL: ftp://ftp.ricoh.co.jp/public/data/mydata.xml
User name: user01
Password: password01

In this URL, "mydata.xml" is designated for the file name, which is used as the indirectly specified file. The multifunctional apparatus 30 does not store image data in the indirectly specified file. The multifunctional apparatus 30 stores the image data in the URL designated by "mydata.xml." After the multifunctional apparatus 30 completes the storage of the image data and determines the file name, the multifunctional apparatus 30 writes the file name to the indirectly specified file.

As described above, the portable terminal 10 can determine the access method to access the cloud storage 50 based on the cloud storage access information 13*a* input by the user. That is, the data processing unit 16 determines the communication method, such as the communication protocol and Web API, based on the "type" in the cloud storage access information 13*a*, and determines the communication destination based on the URL. Further, the designation of the file name can be performed or omitted in some cases. As above described, the cloud storage 50 can employ general servers such as FTP and WebDAV servers, and specific servers such as GoogleDrive/Evernote/Dropbox having specific Web APIs, in which the multifunctional apparatus 30 can access the cloud storage 50 by performing the above described processing.

Further, the cloud storage access information 13*a* is not limited to the above cases. For example, the cloud storage 50 can be other serves such as BOX.net and YahooBox (registered trademark). Further, the cloud storage 50 can be configured to store data by transmitting e-mail to the cloud storage 50, in which an input screen suitable for e-mail format may be prepared by an application.

Operation of Registering Image Data:

Hereinafter, a description is given of an operation of the communication system 100 when a user uses the multifunctional apparatus 30 to scan document, and uses the portable terminal 10 to acquire image data with reference to FIG. 9 (FIGS. 9AA, 9AB, 9BA, and 9BB). FIG. 9 is an example of a sequence diagram when the portable terminal 10 transmits the cloud storage access information 13*a* to the multifunctional apparatus 30, the multifunctional apparatus 30 transmits image data to the cloud storage 50, and then the portable terminal 10 acquires the image data from the cloud storage 50.

S91: A user activates an application on the portable terminal 10.

S91.1: The user operation reception unit 14 checks or confirms whether the authentication information 13*b* is registered in the data storage unit 13. In this example case, it is assumed that the authentication information 13*b* is already registered in the data storage unit 13.

S91.2: Then, the user operation reception unit 14 checks or confirms whether the cloud storage access information 13*a* is registered in the data storage unit 13. In this case, it is assumed that the cloud storage access information 13*a* is already registered in the data storage unit 13.

S91.3: The display control unit 15 of the user operation reception unit 14 displays a list of the cloud storage access information 13*a* acquired from the data storage unit 13 on the display 102. In this configuration, the user can determine which cloud storage 50 is to be used. The user selects one cloud storage access information from the list of cloud storage access information 13*a*. The user operation reception unit 14 receives the user's selection.

S91.4: The display control unit 15 of the portable terminal 10 displays a dialog or a screen on the display 102 requesting an input of a start of scanning operation. In addition to displaying a scanning start button, a screen for inputting the scanning settings (e.g., color/monochrome, resolution, saved file type) by the user can be also displayed on the display 102. If the default setting value of the scanning setting is already set, the user simply presses the scanning start button. Further, it is preferable to display a message such as "place document on the multifunctional apparatus 30" before starting the scanning.

S91.4.1: The user operation reception unit 14 waits until the user operation is input.

S92: The user inputs or enters the scanning settings, if necessary, and inputs or enters the scan start. The user operation reception unit 14 receives the input of the scan start by the user.

S92.1: The user operation reception unit 14 requests the data storage unit 13 to create a storage destination information (storing method). The data storage unit 13 creates a file name of image data of document based on the cloud storage access information 13a selected by the user.

For example, when the cloud storage access information 13a set with FTP is selected, the file name at the end of the URL selected in step S91.3 is used as it is. When the folder is designated as the cloud storage 50 in the cloud storage access information 13a set with FTP, an arbitrary file name (e.g., 001.dat), added by the data processing unit 16, is added to the URL designated by the FTP (<FTP folder URL>/001.dat). This file name is created without overlapping other file names. The same sequence is also applied to WebDAV.

In a case of the Google Drive, the data processing unit 16 determines an arbitrary file name for the folder included in the URL. The file name can be any name that does not overlap other file names. Since the portable terminal 10 can communicate with the cloud storage 50 based on the cloud storage access information 13a, the portable terminal 10 can set the non-overlapping file name.

In a case of the indirectly specified file too, the data processing unit 16 acquires the cloud storage access information 13a as it is. Alternatively, the data processing unit 16 can acquire the indirectly specified file (e.g., xml file) by referring to the cloud storage access information 13a, and transmits the acquired indirectly specified file to the multifunctional apparatus 30.

The user inputs the URL of the cloud storage 50 and the file name, actually used for storing the image data, in the indirectly specified file. For example, as for WebDAV, the indirectly specified file is set as follows.
  <name>Ricoh WebDAV site</name>
  <type>WebDAV</type>
  <url>http://webDAV.ricoh.co.jp</url>
  <path>/public/data/</path>
  <user>user01</user>
  <password>password01</password>

In this example case, it is designated that the image data is to be stored in the folder (/public/data/) designated by the <path>tag of WebDAV, in which the file name is not designated. However, the user can designate the file name.

S92.2: The display control unit 15 displays a message to bring the portable terminal 10 closer to the multifunctional apparatus 30 on the display 102 of the portable terminal 10.

S92.3: The user operation reception unit 14 requests the short-range wireless communication unit 12 to connect the portable terminal 10 with the multifunctional apparatus 30. This connection request allows the portable terminal 10 to connect with the multifunctional apparatus 30 at an early stage when the portable terminal 10 approaches the multifunctional apparatus 30 closer.

S93: The user follows the instructions to bring the portable terminal 10 closer to the multifunctional apparatus 30. The short-range wireless communication unit 12 of the portable terminal 10 detects that the short-range wireless communication unit 12 has approached to the short-range data communication unit 32 of the multifunctional apparatus 30 closer, and then the short-range wireless communication unit 12 establishes the connection with the short-range data communication unit 32 using the short-range wireless communication. After establishing the connection, it is checked whether the short-range wireless communication device 109 of the portable terminal 10 and the short-range wireless communication device 207 of the multifunctional apparatus 30 are capable of communicating with each other. This is because the short-range wireless communication device 109 and the short-range wireless communication device 207 can communicate with each other when the two short-range wireless communication devices are NFC compliant, but cannot communicate with each other when some of the communication standard of the contactless card is used.

S93.1 to S93.1.1: If the short-range wireless communication device 109 and the short-range wireless communication device 207 can communicate with each other, the short-range wireless communication unit 12 of the portable terminal 10 connects with the short-range data communication unit 32 of the multifunctional apparatus 30.

S93.2: When the connection is successful, the user operation reception unit 14 requests the short-range wireless communication unit 12 to transmit the cloud storage access information 13a, the authentication information 13b, the scanning setting, and the file name (if the file name is determined) as the scan information to the multifunctional apparatus 30. For example, the display 102 of the portable terminal 10 may display a QR code (registered trademark) encoding these information, and the QR code can be scanned by using an image capture device of the multifunctional apparatus 30.

S93.2.1: The short-range wireless communication unit 12 transmits the cloud storage access information 13a, the authentication information 13b, the scanning setting, and the file name (if the file name is determined) to the short-range data communication unit 32 of the multifunctional apparatus 30. The information to be transmitted is not limited to these. For example, when the communication speed of the short-range wireless communication is very slow, the communication load can be reduced by transmitting the difference between the initial value and the later value alone, or by using a preset setting for each user without transmitting individual pieces of the scanning setting.

S93.2.1.1: When the short-range data communication unit 32 receives these data, the short-range data communication unit 32 transmits these data to the data analyzing unit 33. The data analyzing unit 33 stores these data in the data storage unit 35, and transmits a transmission success notification or report to the short-range wireless communication unit 12 of the portable terminal 10 via the short-range data communication unit 32.

S93.3: The display control unit 15 and the user operation reception unit 14 display the success of transmission on the display 102 in response to the transmission success notification or report. Since the portable terminal 10 has transmitted the necessary information to the multifunctional apparatus 30, the user can move the portable terminal 10 away from the multifunctional apparatus 30. However, the short-range data communication unit 32 can transmit the operation status of the multifunctional apparatus 30 to the portable terminal 10 at any time.

S93.3.1: The user operation reception unit 14 receives an operation of starting the image data acquisition. The acquisition of image data can be started without performing this operation.

S94: The data analyzing unit 33 of the multifunctional apparatus 30 determines whether the user can log-in to the multifunctional apparatus 30 by using the acquired authentication information 13b.

S94.1: The data analyzing unit 33 reports an authentication result to the user I/F 36.

S94.1.1: The display control unit 38 displays the authentication result on the operation panel 202. The processing is interrupted or stopped when the authentication error occurs.

S95: The data analyzing unit 33 transmits a scan request to the scanning unit 34 together with the scanning setting.

S95.1: The scanning unit 34 of the multifunctional apparatus 30 scans document using the scanning setting.

S96: The data analyzing unit 33 transmits a scan result to the user I/F 36.

S96.1: The display control unit 38 displays the scan result on the operation panel 202.

S98: When the scanning completes successfully, the data analyzing unit 33 of the multifunctional apparatus 30 acquires the URL, the user name, and the password from the cloud storage access information 13a, and transmits a connection request to the LAN communication unit 31.

S98.1: The LAN communication unit 31 connects to the cloud storage 50 based on the URL. Then, the LAN communication unit 31 logs in the cloud storage 50 using the user name and the password.

S99: After the LAN communication unit 31 logs in the cloud storage 50, the data analyzing unit 33 requests the LAN communication unit 31 to transmit the image data to the cloud storage 50 together with the file name if the file name acquired from the portable terminal 10 exists. If the file name does not exist in the cloud storage access information 13a, the data analyzing unit 33 can be used to create the file name, or the cloud storage 50 can assign one file name that does not overlap with other file names.

S99.1: The image data transmission unit 37 transmits the image data generated by the scanning unit 34 to the cloud storage 50 to store the generated image data in the cloud storage 50. Then, the LAN communication unit 31 acquires a response from the cloud storage 50. Hereinafter, the response and the file name when storing or saving the image data are described.

For example, when the image data is transmitted to the cloud storage 50 by using FTP while the file name is designated, the URL set in the access information input screen 501 (FIG. 8) becomes a storage location of the file, and the file name at the end of the URL becomes the file name as it is. In this case, the response is the URL including this file name.

Further, when the image data is transmitted to the cloud storage 50 by using FTP while the folder name is designated with no file name, the data processing unit 16, the data analyzing unit 33, or the cloud storage 50 assigns an arbitrary file name (e.g., 001.dat) to the image data, and transmits the arbitrary file name to the multifunctional apparatus 30, and thereby the arbitrary file name is used. The cloud storage 50 returns the URL including this file name to the multifunctional apparatus 30 as a response.

Further, in a case of the Google Drive, the portable terminal 10 transmits the URL and the file name set in the cloud storage access information 13a to the multifunctional apparatus 30, and thereby the image data transmission unit 37 of the multifunctional apparatus 30 accesses the folder of the cloud storage 50 and stores the image data by designating the file name in the folder.

In a case of the indirectly specified file, the data analyzing unit 33 refers to the cloud storage access information 13a to open the indirectly specified file, and determines the storage destination from the contents of the cloud storage access information 13a. In the above-described indirectly specified file, the file name is not designated. In this case, the file name is not determined until the file is saved or stored. Since the access method to the cloud storage 50 and the path are designated in the indirectly specified file, the image data transmission unit 37 stores the file in the folder designated by the "path." Then, the cloud storage 50 returns the saving success message and the file name of the saved file to the multifunctional apparatus 30 as a response. Then, the image data transmission unit 37 describes or adds the file name in the indirectly specified file. The image data transmission unit 37 also describes a status that the storage of the image data is completed. The contents described in the indirectly specified file can be as follows.

```
<filename>20160821083539.jpg</filename>
<status>complete</status>
```

Since the portable terminal 10 can access the "xml file" by referring the cloud storage access information 13a, the portable terminal 10 can acquire the file name where h the multifunctional apparatus 30 stores the image data even when the file name is not designated from the portable terminal 10.

Further, the image data transmission unit 37 may not be able to store the file in the designated folder in some cases. In a case of the indirectly specified file, the image data transmission unit 37 can store the image data in another location (i.e., location not designated by the indirectly specified file), and the result can be described in the indirectly specified file. The location that is not designated in the indirectly specified file may be set in the multifunctional apparatus 30 in advance or designated by another cloud storage access information 13a.

For example, if the designated cloud storage 50 such as WebDAV server does not have a storage capacity enough to store the file, the image data transmission unit 37 cannot store the file data in the cloud storage 50 using WebDAV server, and thereby the image data transmission unit 37 stores the file, for example, in the cloud storage 50 using FTP. When such processing is performed, the image data transmission unit 37 describes information in the indirectly specified file as follows.

```
<name>ABC FTP site</name>
<type>FTP</type>
<url>ftp://ftp.ABC.co.jp/public/data/mydata.jpg</url>
<user>user01</user>
<password>password01</password>
<status>complete</status>
```

In this case, "mydata.jpg" is used as the file name. Since these information may be pre-set in the multifunctional apparatus 30 or set in another cloud storage access information 13a, the image data transmission unit 37 can rewrite or update the indirectly specified file.

In a case when the multifunctional apparatus 30 rewrites the contents of the cloud storage access information 13a transmitted from the portable terminal 10, and thus the cloud storage 50 designated by the cloud storage access information 13a cannot be used, the multifunctional apparatus 30 and the portable terminal 10 can use another cloud storage 50 as an alternate location or alternative unit.

The portable terminal 10 can access the indirectly specified file, in which the short-range wireless communication unit 12 of the portable terminal 10 can be configured to receive the indirectly specified file from the multifunctional apparatus 30.

S97 to S97.1: After the communication by the short-range wireless is established successfully, the image data acquiring unit 17 of the portable terminal 10 accesses the cloud storage 50 and attempts to acquire the image data. Since the image data cannot be acquired at a stage when the image data is not yet stored in the cloud storage 50 by the multifunctional apparatus 30, steps S97 to S97.1 are repeated until the image data can be acquired.

When the file name is designated in the cloud storage access information 13*a* or the file name is already known to the portable terminal 10, and the file having the file name does not exist in the cloud storage 50, the image data acquiring unit 17 determines that the file having the file name has not been scanned and transmitted by the multifunctional apparatus 30. If the file having the file name designated in the cloud storage access information 13*a* exists in the cloud storage 50, the image data acquiring unit 17 acquires the file.

When the folder alone is designated in the cloud storage access information 13*a* and the file name is unknown to the portable terminal 10, the image data acquiring unit 17 acquires a file (image data) having a time stamp set after the transmission of the cloud storage access information 13*a* in step 93.2. This process is to be described with reference to FIG. 10A. Alternatively, when the cloud storage access information 13*a* is transmitted in step 93.2, the list of the files is saved, and the image data acquiring unit 17 acquires a file not existing in the list.

In a case of the indirectly specified file, the image data acquiring unit 17 refers to the cloud storage access information 13*a* to acquire the indirectly specified file, and checks the status description to confirm the scanning of the document and the transmission of the image data. When the indirectly specified file is used, the folder used for storing the image data may differ from the folder designated by the transmitted cloud storage access information 13*a*, in which the image data acquiring unit 17 refers to the indirectly specified file to retrieve a file in accordance with the URL (i.e., folder and file name) described in the indirectly specified file. This process is to be described with reference to FIG. 10B.

The description returns to FIG. 9 (FIG. 9BB). S110: The image data acquiring unit 17 requests the public line communication unit 11 to acquire the image data.

S110.1: The public line communication unit 11 acquires the image data from the cloud storage 50. When the acquisition of the image data is successful, the acquisition success and the response are acquired. This response includes the file.

S111: When the image data acquiring unit 17 succeeds in acquiring the image data, the image data acquiring unit 17 stores the image data in the data storage unit 13.

S112: The display control unit 15 displays the acquisition completion of the image data on the display 102.

S112.1: The user can recognize that the image data is acquired by viewing the acquisition completion of the image data displayed on the display 102 of the portable terminal 10.

S113: Then, the image data acquiring unit 17 requests the public line communication unit 11 to delete the acquired file from the cloud storage 50 to prevent the image data, such as confidential data, being stored in the cloud storage 50 for a long time, in which the portable terminal 10 instructs the cloud storage 50 to delete the file (electronic data) stored in the cloud storage 50 via the public line communication unit 11 after the portable terminal 10 acquires the file (electronic data) from the cloud storage 50 via the public line communication unit 11 (second communication network).

S113.1: The public line communication unit 11 requests the cloud storage 50 to delete the acquired file. Since the folder and the file name are already known, the image data acquiring unit 17 designates the folder and the file name to delete the file from the cloud storage 50. In this case, the response includes, for example, the deleted file name.

S114 to S114.1: Further, the multifunctional apparatus 30 can perform the deletion of the file. Since the multifunctional apparatus 30 does not recognize whether the image data is acquired or not by the portable terminal 10 unless the file is deleted by the portable terminal 10, the multifunctional apparatus 30 deletes the image data still existing in the cloud storage 50 for a given time period or more after transmitting the image data to the cloud storage 50, which means the multifunctional apparatus 30 instructs the cloud storage 50 to delete the image data, which may still exist in the cloud storage 50, when a given time period or more elapses after transmitting the image data to the cloud storage 50 from the multifunctional apparatus 30. With this configuration, the storing time period of the image data in the cloud storage 50 can be set shorter.

In this case, it is preferable that the multifunctional apparatus 30 stores an error, indicating that the file has not been downloaded, in the data storage unit 35 or the like. By displaying the error message on the operation panel 202 when the user returns to the multifunctional apparatus 30, the user can recognize that the image data of document is transmitted to the cloud storage 50, but the portable terminal 10 does not acquire the image data.

By performing the above described sequence, the image data scanned by the multifunctional apparatus 30 can be acquired by the portable terminal 10. In this configuration, when the portable terminal 10 is brought closer to the multifunctional apparatus 30, the image data is transmitted to the portable terminal 10, so that the user does not need to switch the communication scheme of the portable terminal 10 from the circuit-switched communication to the wireless LAN.

The processing sequence of FIG. 9 is one example, and not limited thereto. For example, the order of steps S91.1 and S91.3 can be reversed. Further, steps S91.1 and S91.3 can be performed simultaneously. Further, it is also possible to perform the general scanning setting (e.g., color/monochrome) before step 91.4.

In the above described sequence, the connection of the portable terminal 10 and the cloud storage 50, and the connection of the multifunctional apparatus 30 and the cloud storage 50 use the circuit-switched public line, but not limited thereto. The communication between the portable terminal 10/multifunctional apparatus 30 and the cloud storage 50 can be any communication method, which can be used with the short-range wireless communication in parallel.

Operation of Portable Terminal:

Hereinafter, a description is given of a sequence of receiving a file by the portable terminal 10 with reference to FIG. 10. FIG. 10A is a flowchart illustrating a sequence when a file name is not designated in the cloud storage access information 13*a*, and FIG. 10B is a flowchart illustrating a sequence when an indirectly specified file is used.

A description is given of FIG. 10A. First, when the cloud storage access information 13*a*, the authentication information 13*b*, the scanning setting and the file name exist, the short-range wireless communication unit 12 stores a time when the file name is transmitted as a transmission time of the file name (S1010*a*).

When the image data acquiring unit 17 starts to acquire image data, the image data acquiring unit 17 acquires a file list of a folder stored in the cloud storage 50 (S1020*a*). The folder is described in the cloud storage access information 13*a*.

The image data acquiring unit 17 determines whether a new file, having transmission time information set after the transmission time of each file identified by the time stamp, exist in the cloud storage 50 (S1030a).

When the determination in step S1030a is "NO," steps S1020a and S1030a are periodically performed to acquire and determine the file list.

When the determination in step S1030a is "YES," the image data acquiring unit 17 acquires the new file having the transmission time later than the transmission time identified by the stored time stamp from the cloud storage 50 (S1040a).

In this way, even when the portable terminal 10 does not transmit the cloud storage access information 13a including the file name to the multifunctional apparatus 30 (i.e., even when the file name is unknown), the portable terminal 10 can acquire the image data. If the cloud storage access information 13a is set with a file name, the image data can be acquired by designating the file name.

A description is given of FIG. 10B. First, the image data acquiring unit 17 acquires an indirectly specified file by referring to the cloud storage access information 13a (S1010b).

Then, the image data acquiring unit 17 determines whether the status of the indirectly specified file is "complete" (S1020b). If the status of the indirectly specified file is not "complete" (S1020b: NO), the image data is not stored in the cloud storage 50, and thereby the image data acquiring unit 17 waits.

When the determination in step S1020b is "YES," the image data acquiring unit 17 acquires a folder location and a file name from the indirectly specified file (S1030b).

Then, the image data acquiring unit 17 acquires the file from the cloud storage 50 (S1040b). In this configuration, even when the image data is stored in a folder different from the folder described in the cloud storage access information 13a, the portable terminal 10 can acquire the file by using the indirectly specified file.

When Portable Terminal cannot acquire Image Data:

Hereinafter, a description is given of a case when the portable terminal 10 cannot acquire the image data. After a user brings the portable terminal 10 closer to the multifunctional apparatus 30, the user may not perform specific operations, in which it is preferable for the user to confirm whether the portable terminal 10 has received the image data. Therefore, the portable terminal 10 notifies or reports the user whether or not the image data is received as follows.

Figure 11:
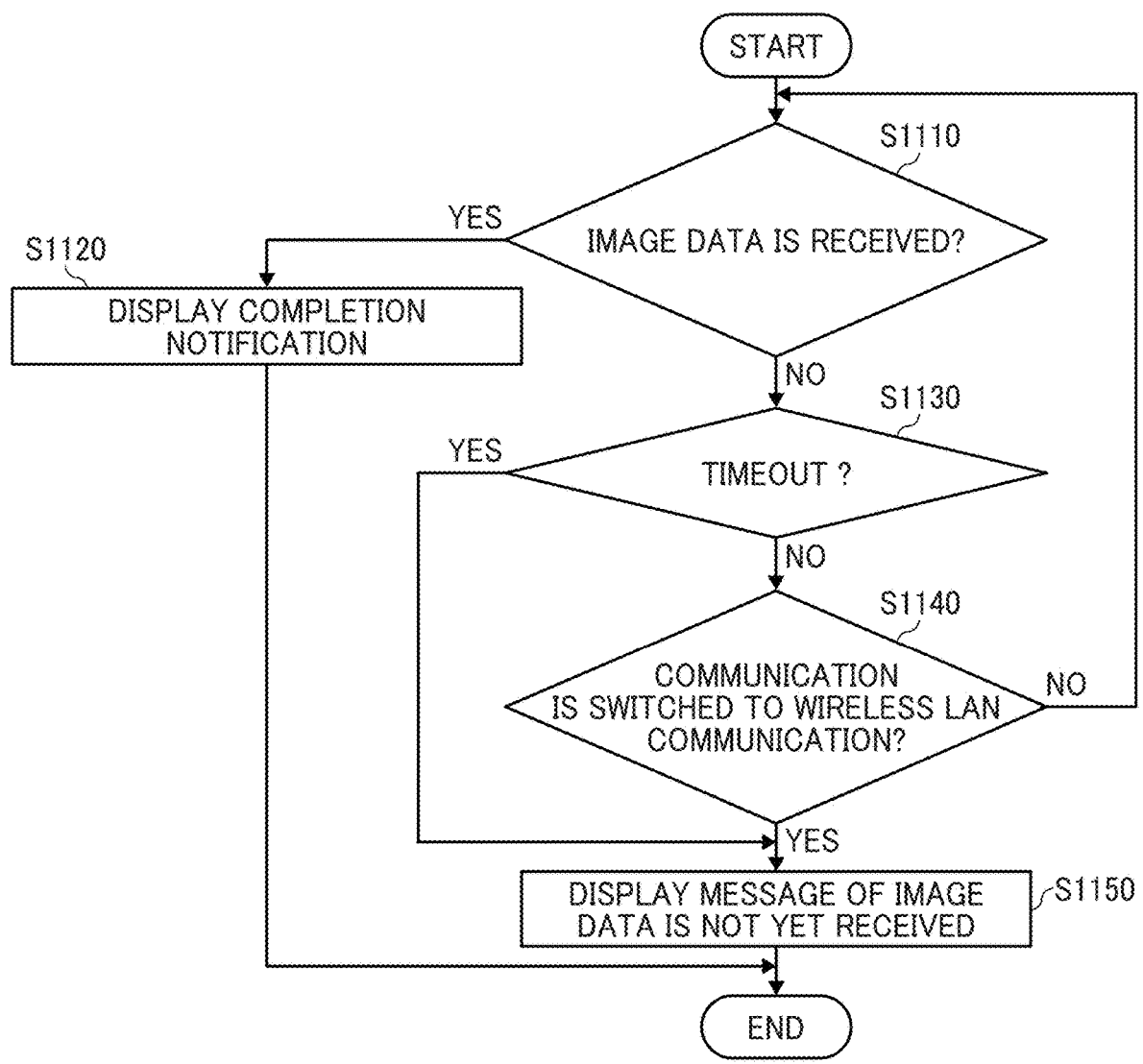
FIG. 11 is an example of a flowchart illustrating a sequence when the portable terminal displays whether or not image data is received.

FIG. 11 is an example of a flowchart illustrating a sequence when the portable terminal 10 displays whether or not the image data is received. The processing of FIG. 11 is executed, for example, after step 97 in FIG. 9.

First, the image data acquiring unit 17 of the portable terminal 10 requests the acquiring of image data to the cloud storage 50 and determines whether image data is received from the cloud storage 50 (S1110).

If the determination in step S1110 is "YES," the image data acquiring unit 17 displays a completion notification or report (S1120).

If the determination in step S1110 is "NO," the image data acquiring unit 17 determines whether the timeout has occurred (S1130). The timeout means that the image data is not acquired from the cloud storage 50 within a given time period even when the portable terminal 10 has requested the image data to the cloud storage 50. For example, the timeout occurs when the communication status of the circuit-switched communication is very slow or failed, and thereby the cloud storage 50 does not respond. Further, the timeout also occurs when the multifunctional apparatus 30 cannot transmit the image data. The given time period may be, for example, 15 minutes to 60 minutes, but a user can set the given time period as appropriate.

If the timeout occurs (step S1130: YES), the sequence proceeds to step 1150. If the timeout does not occur (step S1130: NO), the image data acquiring unit 17 determines whether the communication scheme is switched to the wireless LAN communication (step 1140). Since the portable terminal 10 is assumed to be connected to the circuit-switched communication network, the communication scheme of the portable terminal 10 may be switched to the wireless LAN from the circuit-switched communication network in some cases. In this example case, since the image data in the cloud storage 50 may be deleted when the given time period elapses after transmitting the image data to the cloud storage 50 as above described, the image data stored in the cloud storage 50 may be deleted before the image data acquiring unit 17 acquires the image data. Since the communication switching is controlled, for example, by the OS, it can be determined whether the switching to the wireless LAN communication is performed or not by inquiring the OS.

When the determination in step 1040 is "YES," the display control unit 15 displays, for example, a message of "downloading of image data is not yet completed, but select switching to wireless LAN?" on the display 102 (S1150). With this configuration, the user can determine a priority between receiving the image data and switching to the wireless LAN.

Figure 12:
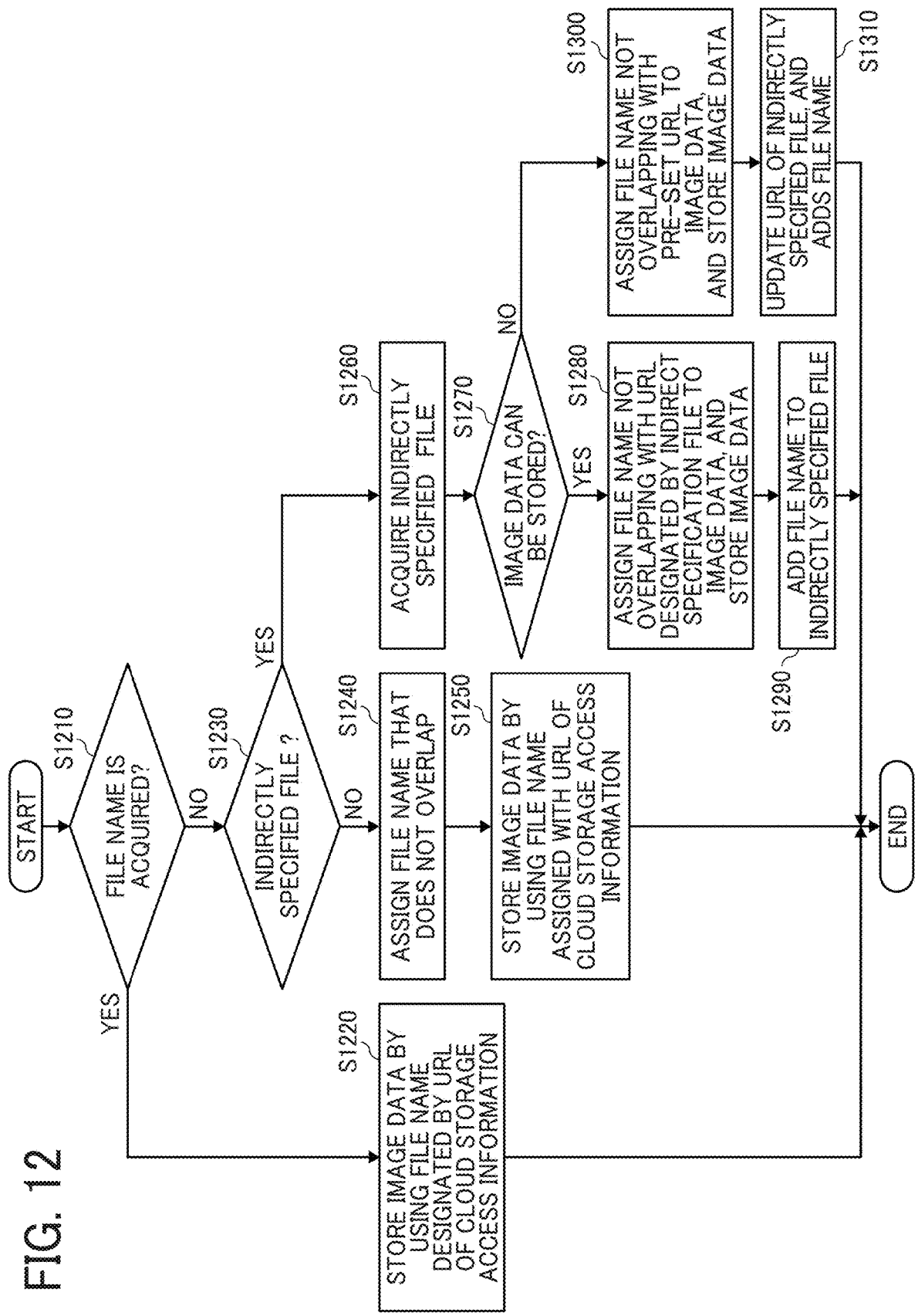
FIG. 12 is an example of a flowchart illustrating a sequence of storing image data in the cloud storage by the multifunctional apparatus.

Operation of Multifunctional Apparatus:

Hereinafter, a description is given of an operation of the multifunctional apparatus 30 with reference to FIG. 12. FIG. 12 is an example of a flowchart illustrating a sequence of storing image data in the cloud storage 50 by the multifunctional apparatus 30. The sequence of FIG. 12 starts, for example, when the multifunctional apparatus 30 scans document and then generates image data.

First, the image data transmission unit 37 of the multifunctional apparatus 30 determines whether a file name is acquired from the portable terminal 10 (S1210).

If the file name is acquired from the portable terminal 10 (S1210: YES), the image data can be saved by using the acquired file name, in which the image data transmission unit 37 stores the image data by using the file name designated by the URL in the cloud storage access information 13a (S1220).

If the file name is not acquired from the portable terminal 10 (S1210: NO), the image data transmission unit 37 determines whether the indirectly specified file is used (S1230). Specifically, the image data transmission unit 37 determines whether the "type" is set with a value of "xxx.indirect" by referring to the cloud storage access information 13a, or determines whether the URL in the cloud storage access information 13a designates, for example, "xml file."

When the determination in step S1230 is "NO," the image data transmission unit 37 assigns a file name that does not overlap other file names (S1240).

Then, the image data is stored by using the file name assigned to the URL of the cloud storage access information 13a (S1250).

When the determination in step S1230 is "YES," the image data transmission unit 37 acquires the indirectly specified file by referring the cloud storage access information 13a because the indirectly specified file is used (step 1260).

Then, the image data transmission unit 37 determines whether the image data can be stored in a storage destination designated by the URL of the indirectly specified file (S1270). For example, by comparing the remaining amount of the storage capacity allocated for the multifunctional apparatus 30 and the size of the image data, the image data transmission unit 37 determines whether the image data can be stored in the designated storage destination. If the size of the image data is greater than the remaining amount of the storage capacity allocated for the multifunctional apparatus 30, the image data transmission unit 37 determines that the image data cannot be stored in the storage destination designated by the URL of the indirectly specified file.

If the determination in step S1270 is "YES," the image data transmission unit 37 assigns a file name that does not overlap with the URL designated by the indirect specification file to store the image data using the assigned file name (S1280).

Then, the image data transmission unit 37 adds the assigned file name to the indirectly specified file (S1290).

If the determination in step S1270 is "NO," the image data transmission unit 37 assigns a file name that does not overlap with a pre-set URL to store the image data using the assigned file name (S1300).

Then, the image data transmission unit 37 updates the URL of the indirectly specified file, and adds the file name (S1310). As above described, the multifunctional apparatus 30 can store the image data in the cloud storage 50 by using the cloud storage access information 13a transmitted from the portable terminal 10.

Security:

As described above, the portable terminal 10 can acquire the image data transmitted to the cloud storage 50. However, when the user can select various types of server as the cloud storage 50 as above described, there is a possibility that virus may intrude in the cloud storage 50 or the virus may be transmitted to the multifunctional apparatus 30.

For example, when the multifunctional apparatus 30 accesses a malicious site, the multifunctional apparatus 30 may be contaminated by the virus, and the stored image data may be altered. If a user uses the cloud storage 50 contaminated by the virus, the multifunctional apparatus 30 may be contaminated by the virus or the portable terminal 10 may acquire the altered image data.

Therefore, in the embodiment, the security problems, which may occur by using various types of server as the cloud storage 50 can be solved by as follows.

Limiting Cloud Storage Used as Access Destination:

If the types of cloud storage 50 accessible by the multifunctional apparatus 30 is limited, the security problems can be reduced. Therefore, an administrator limits the types of the cloud storage 50 accessible by the multifunctional apparatus 30 as follows. The administrator is a person who manages, operates and maintains the use of the multifunctional apparatus 30.

Figure 13:
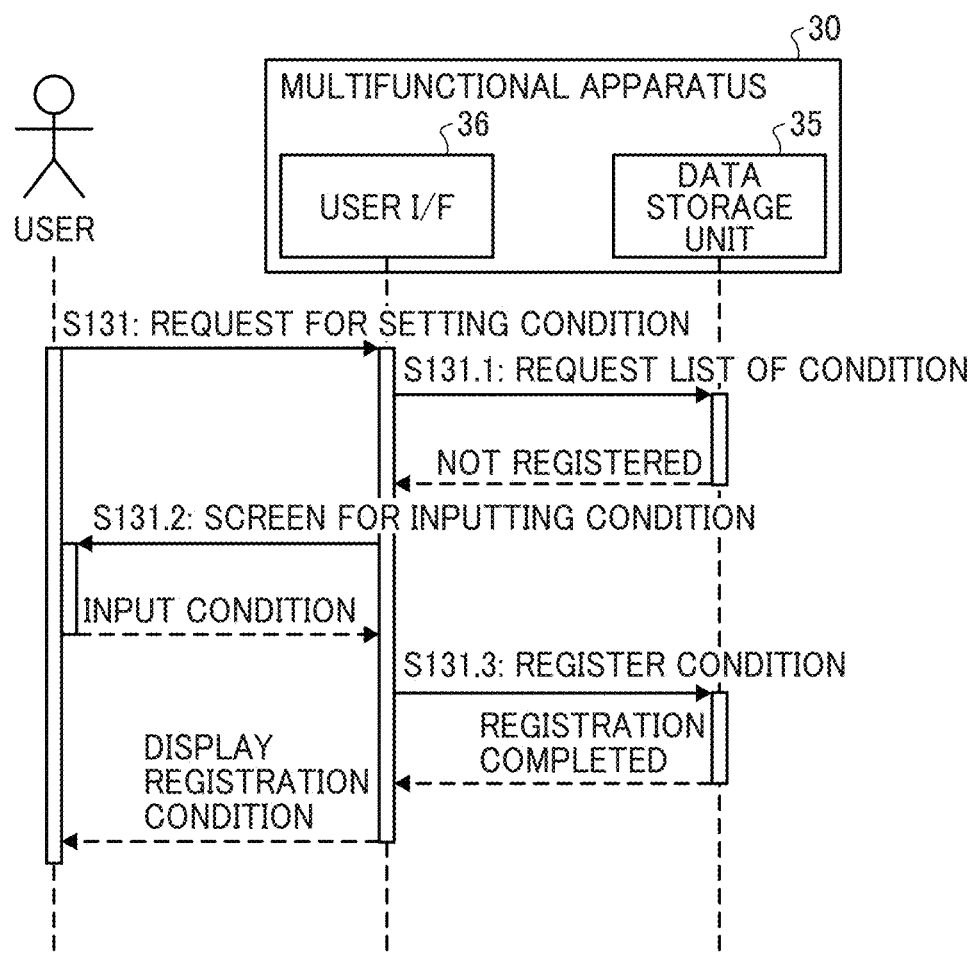
FIG. 13 is an example of a sequence diagram when an administrator sets a restriction on a transmission method of image data to the cloud storage by setting conditions.

FIG. 13 is an example of a sequence diagram when the administrator sets a restriction on the transmission method of image data to the cloud storage 50 by setting conditions. A description is given with reference to FIG. 14, which illustrates a screen 511 used for setting the condition of the storage destination information (storing method).

S131: The administrator operates the multifunctional apparatus 30 to display the screen 511 (FIG. 14) used for setting conditions of the storage destination information (storing method). Typically, the conditions of the storage destination information are set using a setting menu of the multifunctional apparatus 30, in which it is recommended that the administrator alone can set the conditions of the storage destination information in consideration of security. Therefore, the administrator logs in the multifunctional apparatus 30 with an administrator access right.

S131.1: When the user I/F 36 receives the operation of the administrator, the user I/F 36 checks whether the condition of the storage destination information is stored in the data storage unit 13, in which the user I/F 36 may request a list of the conditions of the storage destination information. Since no conditions is registered for the storage destination information at the time of the initial activation, the user I/F 36 determines that the conditions is not yet registered in the data storage unit 13.

S131.2: Then, the display control unit 38 of the user I/F 36 displays the screen 511 used for inputting the conditions of the storage destination information by the administrator on the operation panel 202. Then, the administrator enters or inputs the conditions of the storage destination information. The screen 511 illustrated in FIG. 14 is one example screen.

S131.3: When the user I/F 36 receives the input of the conditions of the storage destination information (storing method) by the administrator, the user I/F 36 stores the conditions of the storage destination information in the data storage unit 13. Then, the display control unit 38 of the user I/F 36 displays the registration completion notice on the operation panel 202.

Figures 14, 15:
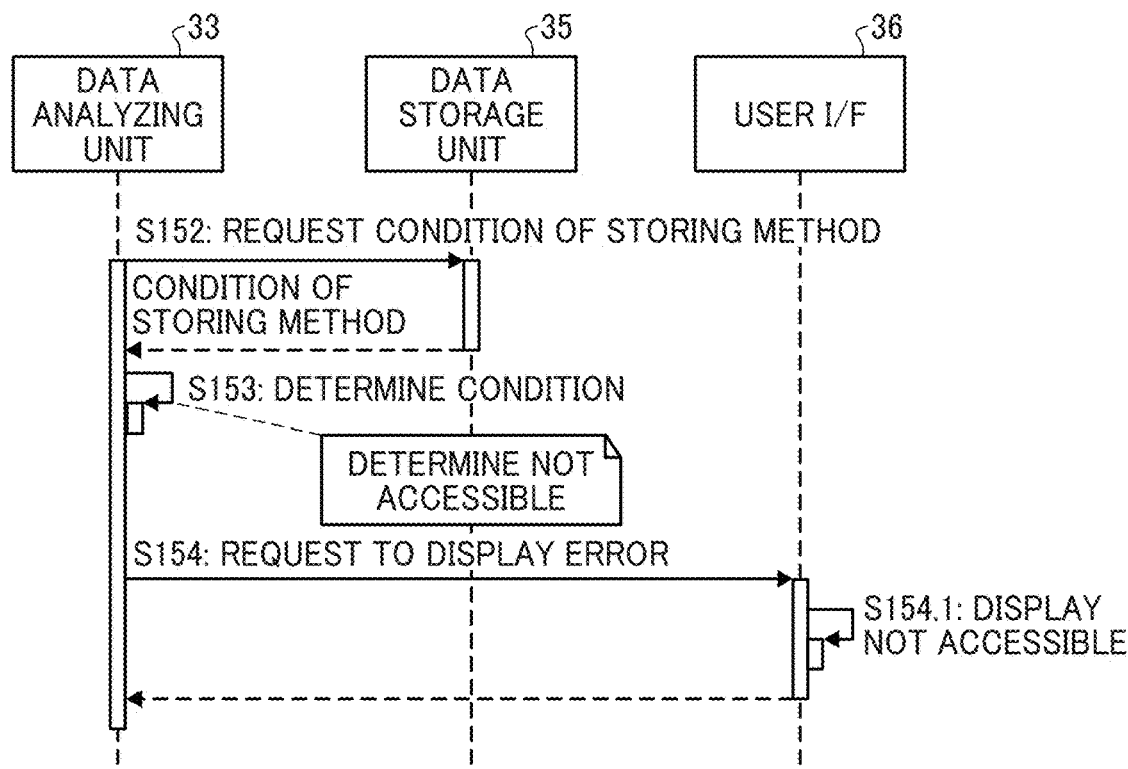
FIG. 14 illustrates an example of a screen used for inputting conditions of storage destination information (storing method)
FIG. 15 illustrates an example of a sequence diagram performed by the multifunctional apparatus when conditions of storage destination information (storing method) does not match.

FIG. 14 illustrates the screen 511 used for inputting the conditions of the storage destination information (storing method). The screen 511 is used by the administrator to restrict the cloud storage 50 accessible by the multifunctional apparatus 30. As illustrated in FIG. 14, the screen 511 displays a message "a. use following address only" with a radio button 512, and "b. not use following address" with a radio button 513. Further, the screen 511 also includes an address input field 514.

For example, if the administrator selects the radio button 512 and enters or inputs *.storage.* in the address input field 514, the multifunctional apparatus 30 accesses the cloud storage 50 having the address (URL) including ".storage." alone. That is, the multifunctional apparatus 30 does not access the cloud storage 50 that does not have the address (URL) including ".storage." When the set address alone is allowed to use, such address is referred to as a white list.

Further, for example, if the administrator selects the radio button 513 and inputs *.free.* in the address input field 514, the multifunctional apparatus 30 is not allowed to access the cloud storage 50 having the address including ".free." That is, the multifunctional apparatus 30 does not access the cloud storage 50 having the address including ".free." When the set address is not allowed to use, such address is referred to as a blacklist.

With this configuration, even when the URL of the cloud storage 50 having uncertain reliability is transmitted from the portable terminal 10, the address of the white list alone is used and the address of the blacklist is not used, with which the security degradation can be suppressed.

Although the address alone is described as the conditions of the storage destination information in this example case, the conditions of the storage destination information is not limited thereto. For example, the access restriction can be set by the size or contents of image data. For example, the image data transmitted by the multifunctional apparatus 30 can be limited such as storing of image data having a size greater than a predetermined size is not allowed, or storing of image data including a specific term (e.g., confidential) is not allowed. For example, if a user erroneously scans a large number of pages and transmits image data of the large number of pages to the cloud storage 50, the multifunctional apparatus 30 can prevent storing the image data in the cloud storage 50.

Further, it is possible to prevent the user from inadvertently registering the confidential image data on the cloud storage 50 by applying the rule that the multifunctional apparatus 30 cannot store the image data written with "confidential." The specific term such as "confidential" can be detected by the optical character recognition (OCR).

Further, a user name (e.g., user name in the authentication information 13*b*) of the portable terminal 10 may be set as the conditions of the storage destination information, in which the access to the cloud storage 50 can be restricted by the user name set in the cloud storage access information 13*a*. For example, if the multifunctional apparatus 30 is disposed in a company, the administrator can set selected users alone can access the cloud storage 50 among employees of the company. As described above, any information acquired by the multifunctional apparatus 30 by the short-range wireless communication can be used to restrict the access right to the cloud storage 50.

Further, since the user authentication is performed by the multifunctional apparatus 30, if the user name (e.g., the user name set in the authentication information 13*b*) authenticated by the multifunctional apparatus 30 and the user name set in the cloud storage access information 13*a* do not match, the multifunctional apparatus 30 may not access the cloud storage 50.

Further, it is also possible to allow access to the cloud storage 50 during a specific time period alone based on the time when the portable terminal 10 and the multifunctional apparatus 30 communicate with each other in short-range wireless communication. Further, a specific user may be combined with the specific time period to allow the access to the specific user alone.

Further, the portable terminal 10, provided by the company that installs the multifunctional apparatus 30, alone may be allowed to acquire image data via the cloud storage 50. Since the portable terminal 10 is supplied by the company, the user name in the authentication information 13*b* is set by the company. Therefore, the company can designate one or more users who can use the cloud storage 50.

FIG. 15 illustrates an example of a sequence diagram performed by the multifunctional apparatus 30 when the conditions of storage destination information (storing method) does not match.

S152: As described above, the data analyzing unit 33 of the multifunctional apparatus 30 already acquires the cloud storage access information 13*a*, the authentication information 13*b*, the scanning setting, and the file name (if there is a file name) from the portable terminal 10, and the authentication of the user is completed as described above. Then, the data analyzing unit 33 requests the storage destination information (storing method) to the data storage unit 35.

S153: When the data analyzing unit 33 acquires the conditions of the storage destination information stored in the data storage unit 35, the data analyzing unit 33 compares the conditions of the storage destination information and the authentication information 13*b*, compares the conditions of the storage destination information and the cloud storage access information 13*a*, or compares the conditions of the storage destination information and the authentication information 13*b* and the cloud storage access information 13*a* to determine whether the image data can be stored in the cloud storage 50. When the image data can be stored in the cloud storage 50, step 92 and the subsequent steps of FIG. 9 are executed.

S154: When the data analyzing unit 33 determines that the multifunctional apparatus 30 is not accessible to the cloud storage 50, the data analyzing unit 133 requests the user I/F 36 to display an error.

S154.1: The display control unit 38 of the user I/F 36 displays a message that the access is to the cloud storage 50 is denied on the operation panel 202. With this configuration, the user can recognize that the cloud storage 50 cannot be accessed from the multifunctional apparatus 30, and the image data cannot be stored in the cloud storage 50

As to the above described communication system 100 of the embodiment, the multifunctional apparatus 30 is configured to the storage destination information (storing method) from the portable terminal 10, and store the image data on the cloud storage 50 on the Internet, which can be used by any user through the circuit-switched public line. Further, as to the above described communication system 100 of the embodiment, the portable terminal 10 is configured to acquire the image data from the cloud storage 50. Since the device (communication I/F 107) of the portable terminal 10 used for connecting with the Internet via the circuit-switched public line, and the short-range wireless communication device 109 of the portable terminal 10 used for connecting the portable terminal 10 with the multifunctional apparatus 30 are different devices, after transmitting the storage destination information (storing method) to the cloud storage 50, the user is not required to switch the communication scheme of the portable terminal 10 to the wireless LAN connection.

Other Applications:

The above described embodiment is one form of implementing the present invention, and the present invention is not limited to such embodiment, but various modifications and substitutions can be made within the scope of the present invention.

For example, the cloud storage 50 is described as being on the Internet, but the cloud storage 50 may be on any network accessible by the portable terminal 10.

In the embodiment described above, the multifunctional apparatus 30 transmits the image data generated by scanning the document to the cloud storage 50. However, the multifunctional apparatus 30 can be configured to transmit data to a server, and then transmit the data, processed by the server and acquired from the server, to the cloud storage 50. The server performs various processing, such as OCR, translation, facial recognition or the like.

In the embodiment described above, when the portable terminal 10 is connected to the Internet, the circuit-switched public line such as 3G/4G/LTE is used, but not limited to thereto. For example, alternative communication scheme to the Internet other than the circuit-switched public line such as 3G/4G/LTE can be used as long as the alternative communication scheme and the short-range wireless communication device can be used in parallel. For example, WiMAX is known.

The configuration illustrated in FIG. 6 is divided according to the main functions in order to facilitate understanding of processing by the portable terminal 10, the multifunctional apparatus 30, and the cloud storage 50, but the present invention is not limited by the above described divided processing unit and the names. The processing of the portable terminal 10, the multifunctional apparatus 30, and the cloud storage 50 can be divided into more processing units according to the processing contents. Further, the one processing unit can be configured to include more processing.

In the embodiment described above, the public line communication unit 11 corresponds to the public line communication network (second communication network), the short-range wireless communication unit 12 corresponds to the short-range wireless communication network (first communication network), the wireless LAN communication unit 18 corresponds to the wireless LAN communication network (third communication network), the display control unit 15 is an example of the display control unit, the short-range data communication unit 32 is an example of a storage destination information receiving unit, and the scanning unit 34 is an example of an electronic data acquisition unit, and the image data transmission unit 37 is an example of an image data storing unit.

As above described, the information processing apparatus of the embodiment does not require switching of the communication scheme when acquiring electronic data.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An electronic apparatus comprising:
   processing circuitry configured to,
      receive, via a first communication network operating according to a short range wireless communication protocol, storage destination information and authentication information from an information processing apparatus, the storage destination information received via the first communication network including a network address of a storage device different from the electronic apparatus and the information processing apparatus that is a storage destination of electronic data to be generated by the electronic apparatus performing a scanning operation and the authentication information including information used to authenticate with the storage device that is the storage destination of the electronic data,
      generate the electronic data by performing the scanning operation in response to a request to perform the scanning operation received from the information processing apparatus via the first communication network, and
      transmit, via a second communication network different from the first communication network, the electronic data generated by the scanning operation, to the storage destination based on the storage destination information and the authentication information previously received via the first communication network from the information processing apparatus.

2. The electronic apparatus of claim 1, wherein the electronic apparatus is configured to use the first communication network and the second communication network in parallel.

3. The electronic apparatus of claim 1, wherein the processing circuitry is configured to instruct the storage device to delete the electronic data stored in the storage device via the second communication network when the processing circuitry determines that a given time period or more elapses after transmitting the electronic data to the storage device from the electronic apparatus.

4. The electronic apparatus of claim 1, wherein the information processing apparatus is a mobile terminal, and the electronic apparatus is configured to perform the scanning operation based on the request from the mobile terminal while the mobile terminal is not connected to the second communication network.

5. The electronic apparatus of claim 1, wherein
   the second communication network is one of a plurality of other communication networks.

6. The electronic apparatus of claim 5, wherein
   the electronic apparatus is configured to receive the request to perform the scanning operation from the information processing apparatus while the information processing apparatus is not connected to the plurality of other communication networks utilized to transmit the electronic data generated by the scanning operation.

7. The electronic apparatus of claim 1, wherein the information processing apparatus is configured to acquire, via a third communication network that is one of a plurality of other communication networks different from the first communication network, the electronic data from the storage destination based on the storage destination information transmitted via the first communication network.

8. A communication system comprising:
   an information processing apparatus;
   an electronic apparatus configured to communicate with the information processing apparatus; and
   a storage device on a network configured to communicate with the information processing apparatus and the electronic apparatus,
   wherein the information processing apparatus includes first processing circuitry configured to,
      transmit, via a first communication network operating according to a short range wireless communication protocol, a storage destination information and authentication information to the electronic apparatus, the storage destination information transmitted via the first communication network including a network address of the storage device different from the electronic apparatus and the information processing apparatus that is a storage destination of electronic data and the authentication information including information used to authenticate with the storage device that is the storage destination of the electronic data,
      transmit, via the first communication network, a request to the electronic apparatus to perform a scanning operation, and acquire, via a second communication network different from the first communication network, the electronic data from the storage device based on the storage destination information transmitted via the first communication network, wherein the electronic apparatus includes second processing circuitry configured to, receive, via the first communication network, the storage destination information and the authentication information from the information processing apparatus, generate the electronic data by performing the scanning operation in response to the request to perform the scanning operation from the information processing apparatus, and store the electronic data in the storage device on the network via a third communication network based on the storage destination information and the authentication information previously received from the information processing apparatus.

9. The communication system of claim 8, wherein the information processing apparatus is a mobile terminal such that the mobile terminal is configured to transmit the request the electronic apparatus perform the scanning operation while the mobile terminal is not connected to the second communication network.

10. A method of operating an electronic apparatus, the method comprising:

receiving, via a first communication network operating according to a short range wireless communication protocol, storage destination information and authentication information from an information processing apparatus, the storage destination information received via the first communication network including a network address of a storage device different from the electronic apparatus and the information processing apparatus that is a storage destination of electronic data to be generated by the electronic apparatus performing a scanning operation and the authentication information including information used to authenticate with the storage device that is the storage destination of the electronic data;

generating the electronic data by performing the scanning operation in response to a request to perform the scanning operation received from the information processing apparatus via the first communication network; and transmitting, via a second communication network different from the first communication network, the electronic data generated by the scanning operation, to the storage destination based on the storage destination information and the authentication information previously received via the first communication network from the information processing apparatus.

11. The method of claim 10, wherein the electronic apparatus is configured to use the first communication network and the second communication network in parallel.

12. The method of claim 10, further comprising: instructing the storage device to delete the electronic data stored in the storage device via the second communication network when the electronic apparatus determines that a given time period or more elapses after transmitting the electronic data to the storage device from the electronic apparatus.

13. The method of claim 10, wherein the information processing apparatus is a mobile terminal, and the electronic apparatus is configured to perform the scanning operation based on the request from the mobile terminal while the mobile terminal is not connected to the second communication network.

14. The method of claim 10, wherein
the second communication network is one of a plurality of other communication networks.

15. The method of claim 14, wherein
the electronic apparatus is configured to receive the request to perform the scanning operation from the information processing apparatus while the information processing apparatus is not connected to the plurality of other communication networks utilized to transmit the electronic data generated by the scanning operation.

16. The method of claim 10, wherein the information processing apparatus is configured to acquire, via a third communication network that is one of a plurality of other communication networks different from the first communication network, the electronic data from the storage destination based on the storage destination information transmitted via the first communication network.

* * * * *